(12) United States Patent
Huang et al.

(10) Patent No.: US 11,846,402 B2
(45) Date of Patent: Dec. 19, 2023

(54) DOWNLIGHT APPARATUS

(71) Applicant: XIAMEN ECO LIGHTING CO. LTD., Xiamen (CN)

(72) Inventors: Huiyong Huang, Xiamen (CN); Zhenyu Tang, Xiamen (CN); Shuxing Gao, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 18/071,971

(22) Filed: Nov. 30, 2022

(65) Prior Publication Data

US 2023/0088710 A1 Mar. 23, 2023

Related U.S. Application Data

(63) Continuation of application No. 17/470,939, filed on Sep. 9, 2021, now Pat. No. 11,566,760.

(30) Foreign Application Priority Data

| Sep. 9, 2020 | (CN) | 202021962277.X |
| Sep. 9, 2020 | (CN) | 202021962480.7 |
| Sep. 9, 2020 | (CN) | 202021962759.5 |
| Sep. 9, 2020 | (CN) | 202021963435.3 |
| Sep. 9, 2020 | (CN) | 202021963476.2 |
| Sep. 10, 2020 | (CN) | 202021973305.8 |
| Sep. 10, 2020 | (CN) | 202021973469.0 |
| Sep. 10, 2020 | (CN) | 202021973704.4 |
| Sep. 10, 2020 | (CN) | 202021973937.4 |
| Sep. 10, 2020 | (CN) | 202021974013.6 |

(Continued)

(51) Int. Cl.
  *F21S 8/02* (2006.01)
  *F21V 21/04* (2006.01)
  (Continued)

(52) U.S. Cl.
  CPC .............. *F21S 8/026* (2013.01); *F21S 8/02* (2013.01); *F21V 15/01* (2013.01); *F21V 21/04* (2013.01);
  (Continued)

(58) Field of Classification Search
  CPC .......... F21V 21/04; F21V 23/04; F21V 23/06; F21V 23/007; F21Y 2115/10
  See application file for complete search history.

(56) References Cited

U.S. PATENT DOCUMENTS 11,566,760 B2 * 1/2023 Huang .................... F21V 23/06

* cited by examiner

*Primary Examiner* — Anabel Ton
(74) *Attorney, Agent, or Firm* — Chun-Ming Shih; LANWAY IPR SERVICES

(57) ABSTRACT

A downlight apparatus includes a light source, a light housing and a stop unit. The driver box is used for storing a driver. The driver is connected to an external power source to generate a driving current to the light source. The driver box has a wall with an installation escape. The light housing has a light holder and a rim. The light source is stored in the light holder. The rim defines a light opening for a light of the light source to escape. The stop unit is fixed to the installation escape. The stop unit has a switch holder and a wire holder. A manual switch is placed in the switch holder and an enlarged wire head of an power wire is placed in the wire holder. An operation part of the manual switch is exposed outside the driver box. The manual switch is connected to the driver for adjusting a setting of the driver.

19 Claims, 47 Drawing Sheets

(30) Foreign Application Priority Data

Sep. 10, 2020 (CN) .................. 202021974312.X
Sep. 10, 2020 (CN) .................. 202021974314.9
Sep. 10, 2020 (CN) .................. 202021974622.1

(51) Int. Cl.

| | |
|---|---|
| *F21V 23/00* | (2015.01) |
| *F21V 23/04* | (2006.01) |
| *F21V 21/14* | (2006.01) |
| *F21V 29/70* | (2015.01) |
| *F21V 15/01* | (2006.01) |
| *F21V 8/00* | (2006.01) |
| *F21V 21/26* | (2006.01) |
| *F21V 23/06* | (2006.01) |
| *F21Y 115/10* | (2016.01) |

(52) U.S. Cl.
CPC .............. *F21V 21/14* (2013.01); *F21V 21/26* (2013.01); *F21V 23/003* (2013.01); *F21V 23/007* (2013.01); *F21V 23/04* (2013.01); *F21V 23/06* (2013.01); *F21V 29/70* (2015.01); *G02B 6/0085* (2013.01); *F21V 21/047* (2013.01); *F21V 21/049* (2013.01); *F21Y 2115/10* (2016.08)

DOWNLIGHT APPARATUS

RELATED APPLICATION

The present application is a continued application of U.S. patent application Ser. No. 17/470,939.

FIELD

The present invention is related to a downlight apparatus, and more particularly related to a downlight apparatus with a convenient assembly design.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation.

It is also important to consider heat dissipation and water proof.

It is also important to consider element design. Even small changes can make installation and assembly more convenient, which may also reduce manufacturing cost.

Therefore, it is beneficial to design a light device with multiple advantages. Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation.

It is also important to consider heat dissipation and water proof.

It is also important to consider element design. Even small changes can make installation and assembly more convenient, which may also reduce manufacturing cost.

Therefore, it is beneficial to design a light device with multiple advantages. Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation.

It is also important to consider heat dissipation and water proof.

It is also important to consider element design. Even small changes can make installation and assembly more convenient, which may also reduce manufacturing cost.

Therefore, it is beneficial to design a light device with multiple advantages. Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation.

It is also important to consider heat dissipation and water proof.

It is also important to consider element design. Even small changes can make installation and assembly more convenient, which may also reduce manufacturing cost.

Therefore, it is beneficial to design a light device with multiple advantages.

SUMMARY

In some embodiments, a downlight apparatus includes a light source, a light housing and a stop unit.

The driver box is used for storing a driver.

The driver is connected to an external power source to generate a driving current to the light source.

The driver box has a wall with an installation escape.

The light housing has a light holder and a rim.

The light source is stored in the light holder.

The rim defines a light opening for a light of the light source to escape.

The stop unit is fixed to the installation escape.

The stop unit has a switch holder and a wire holder.

A manual switch is placed in the switch holder and an enlarged wire head of an power wire is placed in the wire holder.

An operation part of the manual switch is exposed outside the driver box.

The manual switch is connected to the driver for adjusting a setting of the driver.

In some embodiments, the installation escape is a first U-shape concave on the wall of the driver box. The stop unit is inserted into the first U-shape concave along two lateral edges of the first U-shape concave.

In some embodiments, the stop unit has two lateral grooves as tracks for sliding the two lateral edges of the first U-shape concave to attach the stop unit to the driver box.

In some embodiments, a front plate and a back plate of the stop unit form the two lateral grooves.

The front plate is closer to outside of the driver box than the back plate.

The back plate has a larger diameter than the front plate to prevent water to move in the drive box.

In some embodiments, the switch holder is a second concave U-shape concave of the stop unit.

The manual switch is inserted and fixed to the second U-shape concave.

In some embodiments, the switch holder has two switch grooves for inserting and fixing two lateral edges of the manual switch.

In some embodiments, the switch holder has a front space and a back space.

The back space is used for storing a switch board.

The front space is used for storing an operation unit of the manual switch.

In some embodiments, the wire holder is a third U-shape concave of the stop unit.

The enlarged wire head is inserted and fixed to the third U-shape concave.

In some embodiments, the downlight apparatus may also include a electrode socket.

The light source includes a light source plate mounted with LED modules.

The light source plate has a plate hole for inserting and fixing the electrode socket.

In some embodiments, the electrode socket has an insulation base with a first electrode groove and a second electrode groove.

The insulation base defines a first electrode hole and second electrode hole, the electrode socket has a first metal unit and a second metal unit, the first metal unit and the second metal unit respectively have elastic receivers for inserting a driver electrode electrically connecting to the driver.

In some embodiments, the first metal unit and the second metal unit respectively have an elongated bar respectively extending along the first electrode groove and the second electrode groove.

The first metal unit and the second metal unit respectively have a contact end for electrically connecting to the LED modules on the light source plate.

In some embodiments, the first electrode groove and the second electrode groove are above a top surface of the light source plate.

In some embodiments, the contact ends extend along an edge of the insulation to be welded to light source electrodes of the light source plate.

In some embodiments, electrode receiver has an elastic clip for inserting the driver electrode.

In some embodiments, the elastic clip is a reverse hook with a smaller force on attaching the driver electrode to the electrode receiver than detaching the driver electrode off the electrode receiver.

In some embodiments, any metal part of the electrode socket and the driver electrode is kept longer than 4 mm from any metal part of the light source plate.

In some embodiments, any metal part of the electrode socket and the driver electrode is kept longer than 4 mm from any metal part of the light source plate.

In some embodiments, the insulation base has a light reflective layer for redirecting the light of the light source.

In some embodiments, the electrode socket has an antenna socket for plugging an antenna.

In some embodiments, the insulation base has a middle protrusion separating the first electrode groove and the second electrode groove.

DETAILED DESCRIPTION

In some embodiments, a downlight apparatus includes a light source 6014, a driver box 6001, a light housing 6007 and a stop unit 6015.

The driver box 6001 is used for storing a driver 6019.

The driver 6019 is connected to an external power source to generate a driving current to the light source 6014. The driver 6019 may include a rectifier, a transformer, a filter, a current source, a protection circuit and other components.

The driver box 6001 has a wall 6025 with an installation escape 6002.

The light housing 6007 has a light holder 6005 and a rim 6006.

The light source 6014 is stored in the light holder 6005.

The rim 6006 defines a light opening 6026 for a light of the light source 6014 to escape.

The stop unit 6015 is fixed to the installation escape 6002.

The stop unit 6015 has a switch holder 6010 and a wire holder 6011.

A manual switch 6008 is placed in the switch holder 6010 and an enlarged wire head 6012 of an power wire 6013 is placed in the wire holder 6011.

An operation part 6009 of the manual switch 6008 is exposed outside the driver box 6001.

The manual switch 6008 is connected to the driver 6019 for adjusting a setting of the driver 6019.

In some embodiments, the installation escape 6002 is a first U-shape concave on the wall of the driver box 6001. The stop unit 6015 is inserted into the first U-shape concave along two lateral edges of the first U-shape concave.

Figure 74:
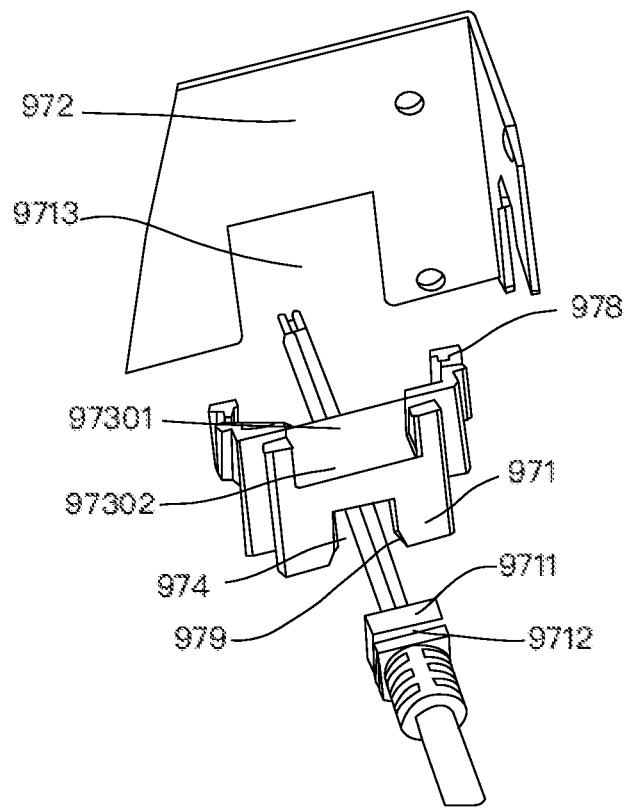
FIG. 74 illustrates an exploded view of the example in FIG. 73.

FIG. 74 shows such an example. In FIG. 74, the driver box 972 has a first U-shape concave 9713 for inserting the stop unit 9721.

Figure 78:
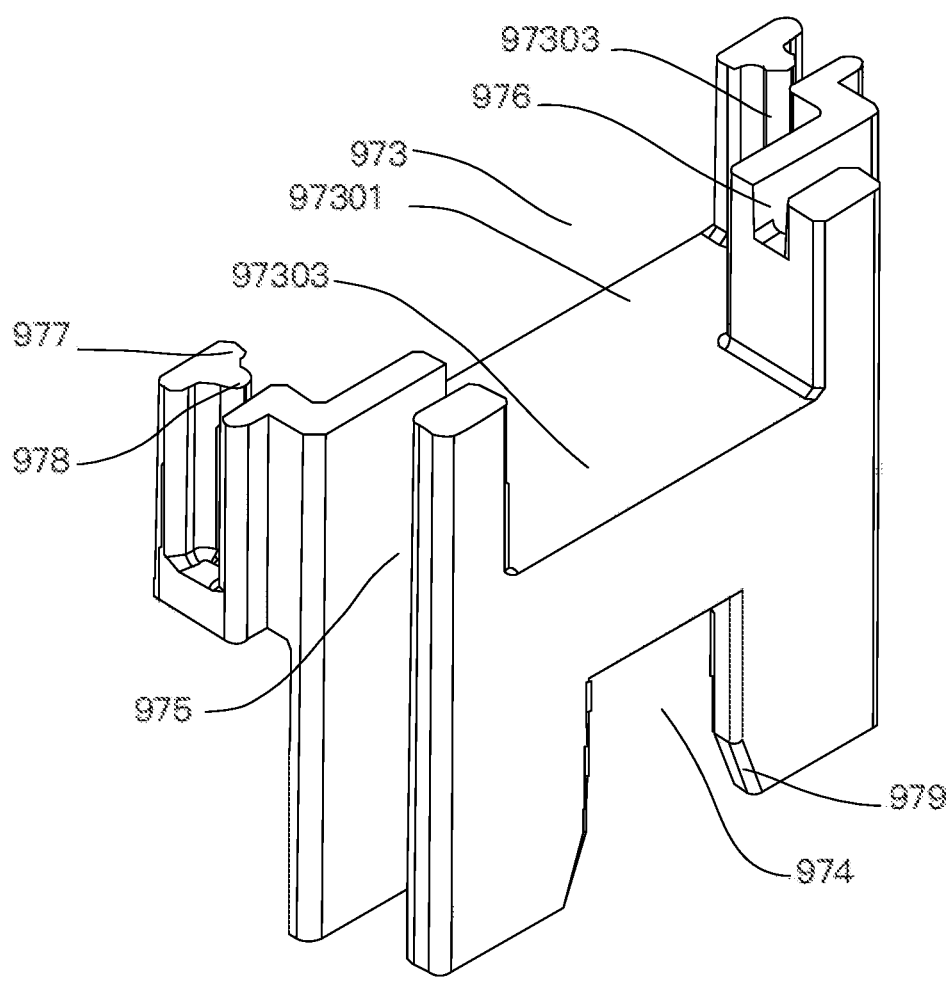
FIG. 78 illustrates another view of the wiring unit.

In FIG. 78, the stop unit has two lateral grooves 975 as tracks for sliding the two lateral edges of the first U-shape concave to attach the stop unit to the driver box.

In FIG. 78, a front plate 9792 and a back plate 9791 of the stop unit form the two lateral grooves 975.

The front plate 9792 is closer to outside of the driver box than the back plate 9791.

The back plate 9791 has a larger diameter than the front plate 9792 to prevent water to move in the drive box.

In some embodiments, the switch holder is a second concave U-shape concave of the stop unit.

The manual switch is inserted and fixed to the second U-shape concave 973.

In some embodiments, the switch holder has two switch grooves 976 for inserting and fixing two lateral edges of the manual switch.

In some embodiments, the switch holder has a front space 97303 and a back space 97301.

The back space 97301 is used for storing a switch board. For example, a manual switch is a switch board mounted with a lever or a slider.

The front space 97301 is used for storing an operation unit of the manual switch.

In some embodiments, the wire holder is a third U-shape concave 974 of the stop unit.

The enlarged wire head is inserted and fixed to the third U-shape concave.

Figure 87:
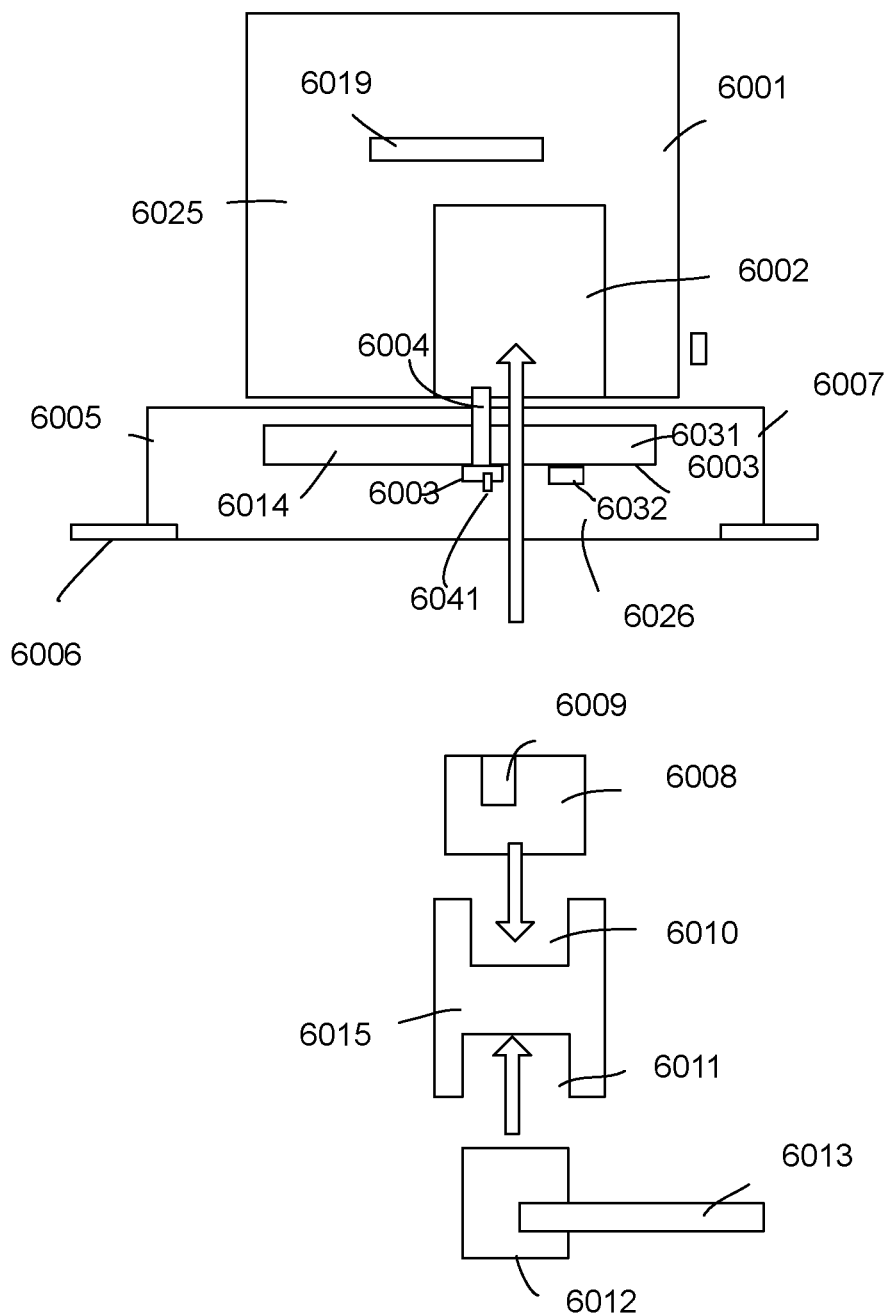
FIG. 87 shows another downlight apparatus.

In FIG. 87, the downlight apparatus may also include a electrode socket 6003.

The light source includes a light source plate 6031 mounted with LED modules 6032.

The light source plate 6031 has a plate hole for inserting and fixing the electrode socket 6003.

Figure 28:
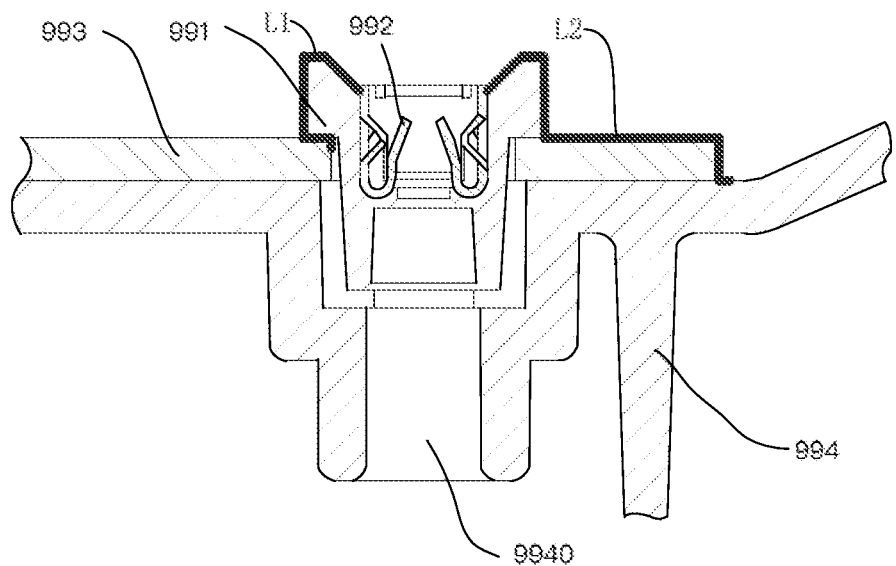
FIG. 28 illustrates an electricity distance diagram.

In FIG. 28, a plate hole 9991 is used inserting the electrode socket 9992.

Figure 25:
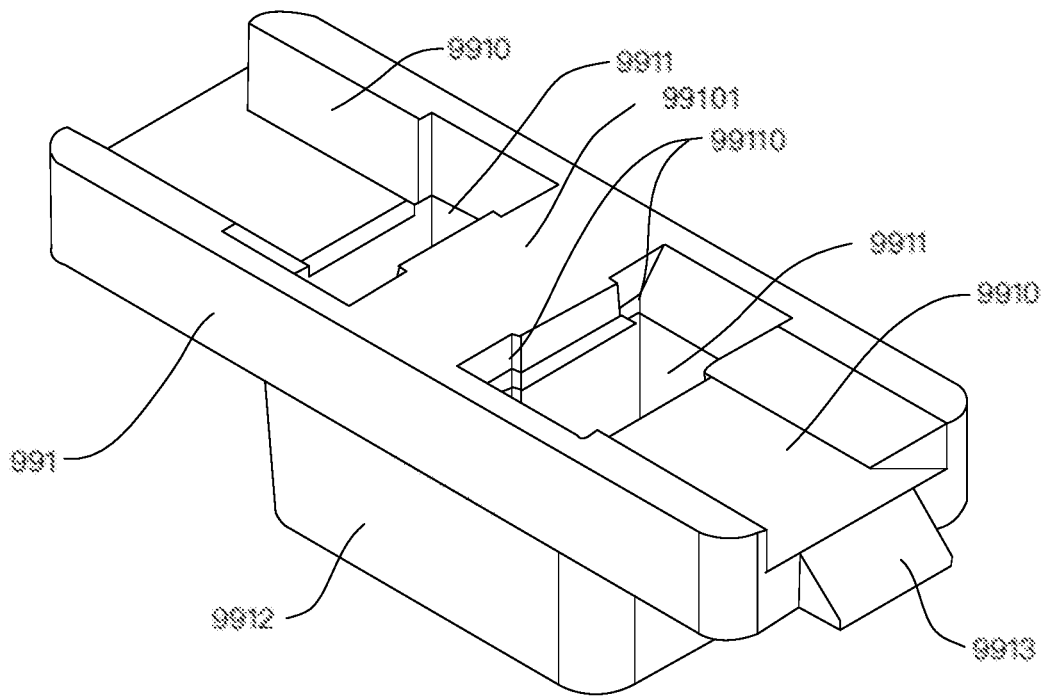
FIG. 25 illustrates a component in FIG. 24.

In FIG. 25, the electrode socket 9912 has an insulation base 991 with a first electrode groove and a second electrode groove 9910.

The insulation base defines a first electrode hole and second electrode hole 9911.

Figure 26:
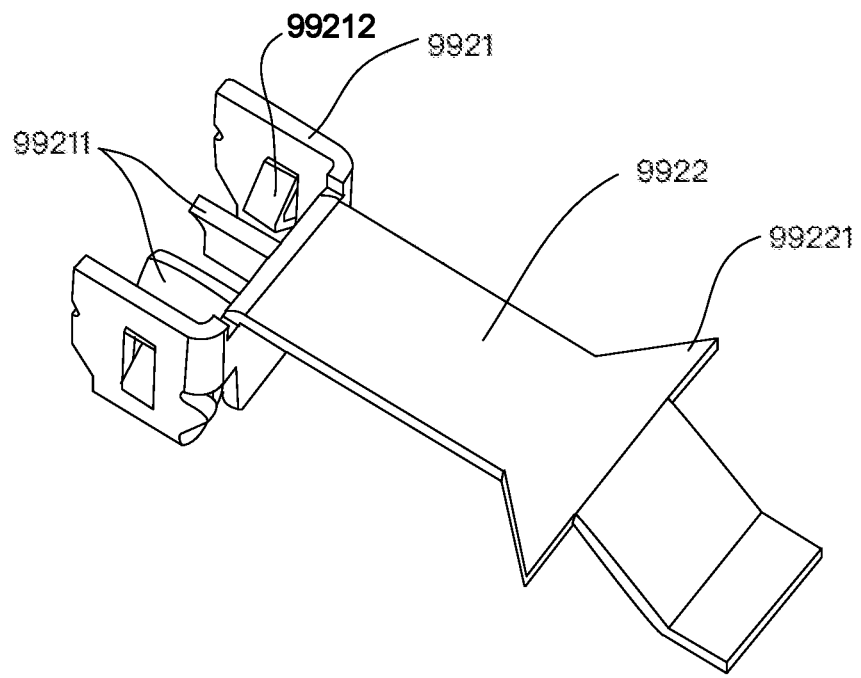
FIG. 26 illustrates another component in FIG. 24.

In FIG. 26, the electrode socket has a first metal unit and a second metal unit 9922. The first metal unit and the second metal unit 9922 respectively have elastic receivers 99212 for inserting a driver electrode electrically connecting to the driver.

In some embodiments, the first metal unit and the second metal unit 9922 respectively have an elongated bar 99227 respectively extending along the first electrode groove and the second electrode groove.

The first metal unit and the second metal unit respectively have a contact end 99228 for electrically connecting to the LED modules on the light source plate.

In some embodiments, the first electrode groove and the second electrode groove are above a top surface of the light source plate, as illustrated in FIG. 28.

In some embodiments, the contact ends extend along an edge of the insulation to be welded to light source electrodes of the light source plate.

In FIG. 26, electrode receiver 99212 has an elastic clip 99211 for inserting the driver electrode.

In some embodiments, the elastic clip 99211 is a reverse hook with a smaller force on attaching the driver electrode to the electrode receiver than detaching the driver electrode off the electrode receiver In some embodiments, any metal part of the electrode socket and the driver electrode is kept longer than 4 mm from any metal part of the light source plate.

In some embodiments, any metal part of the electrode socket and the driver electrode is kept longer than 1 mm from any metal part of the light source plate.

For example, the L1 and L2 distance are longer than 4 mm or 1 mm depending on whether the downlight device is used in water environment or not.

In some embodiments, the insulation base has a light reflective layer for redirecting the light of the light source. For example, a surface of the insulation base is painted with white paint so as to increase a light reflective rate, particularly when the insulation base is protruding above the surface for mounting the LED modules, which may cause shadow or undesired effect.

In some embodiments, the electrode socket has an antenna socket 6041 for plugging an antenna. For example, an antenna is plugged to the antenna socket 6041.

In FIG. 25, the insulation base has a middle protrusion 99101 separating the first electrode groove and the second electrode groove.

Figure 1:
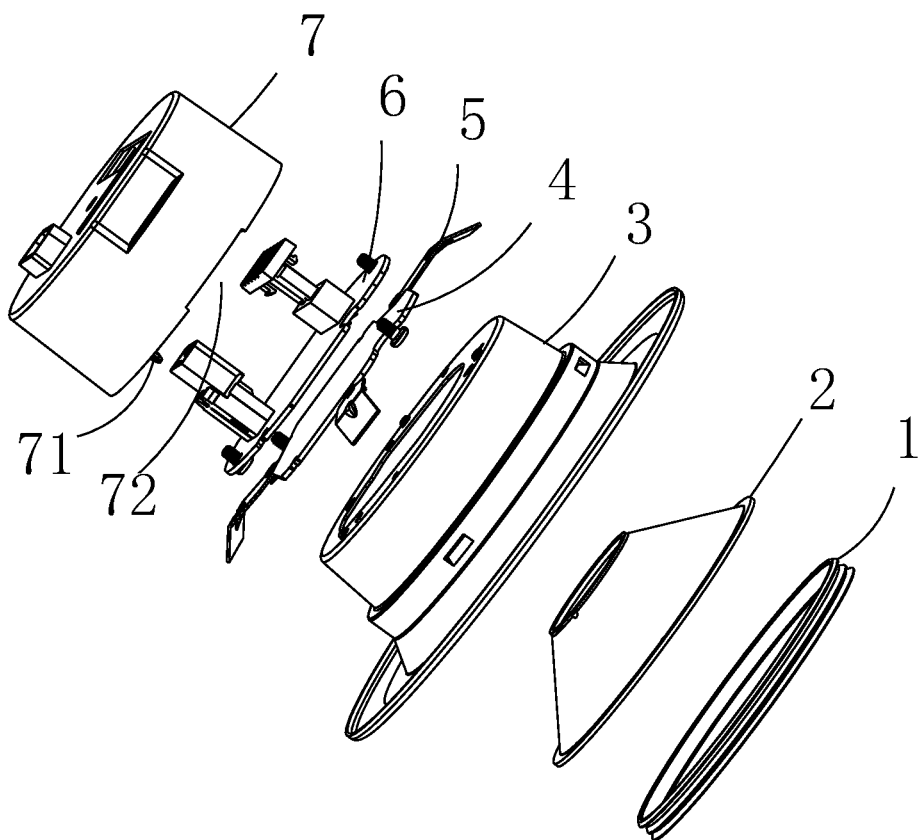
FIG. 1 illustrates an exploded view of a downlight apparatus.

FIG. 1 illustrates an exploded view of a downlight apparatus.

Figure 2:
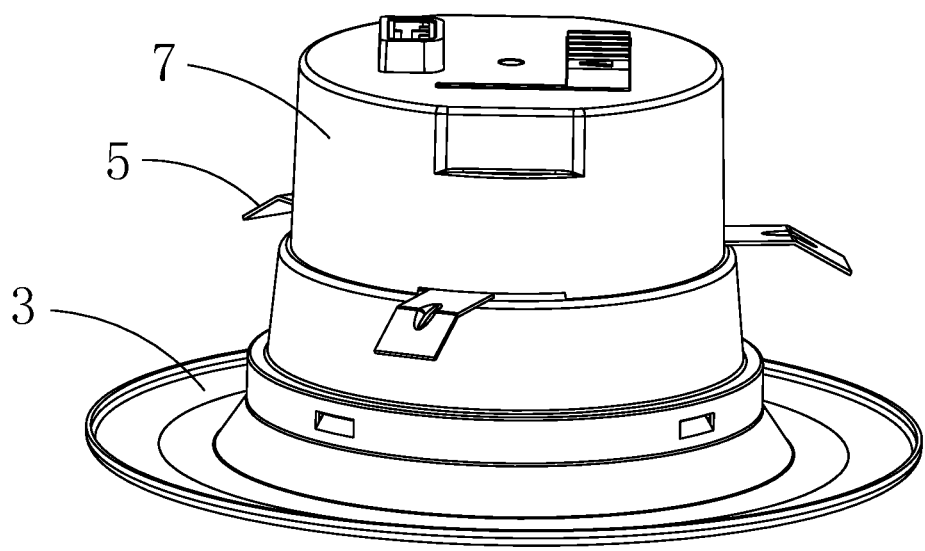
FIG. 2 illustrates a side view of the downlight apparatus of FIG. 1.

FIG. 2 illustrates a side view of the downlight apparatus of FIG. 1.

Figure 3:
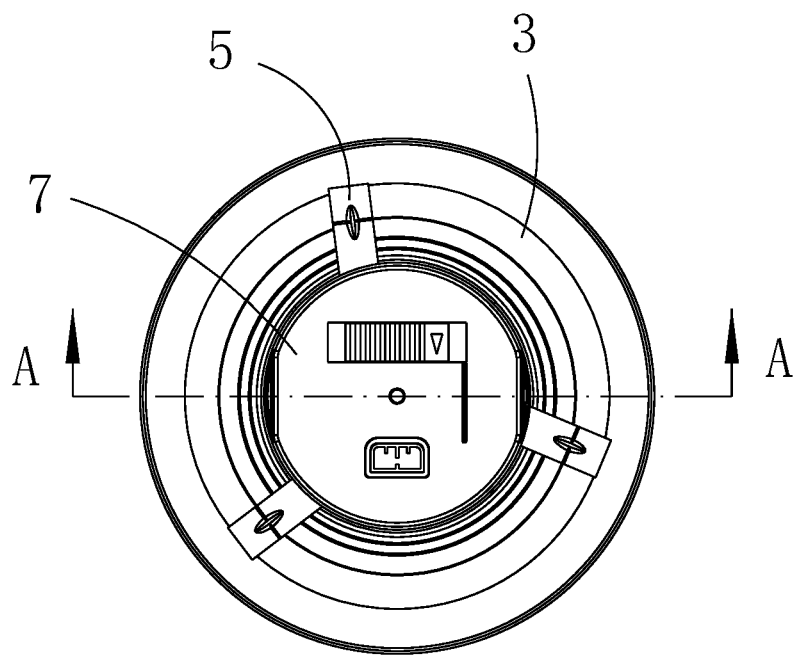
FIG. 3 illustrates a top view of the downlight apparatus of FIG. 1.

FIG. 3 illustrates a top view of the downlight apparatus of FIG. 1.

Figure 4:
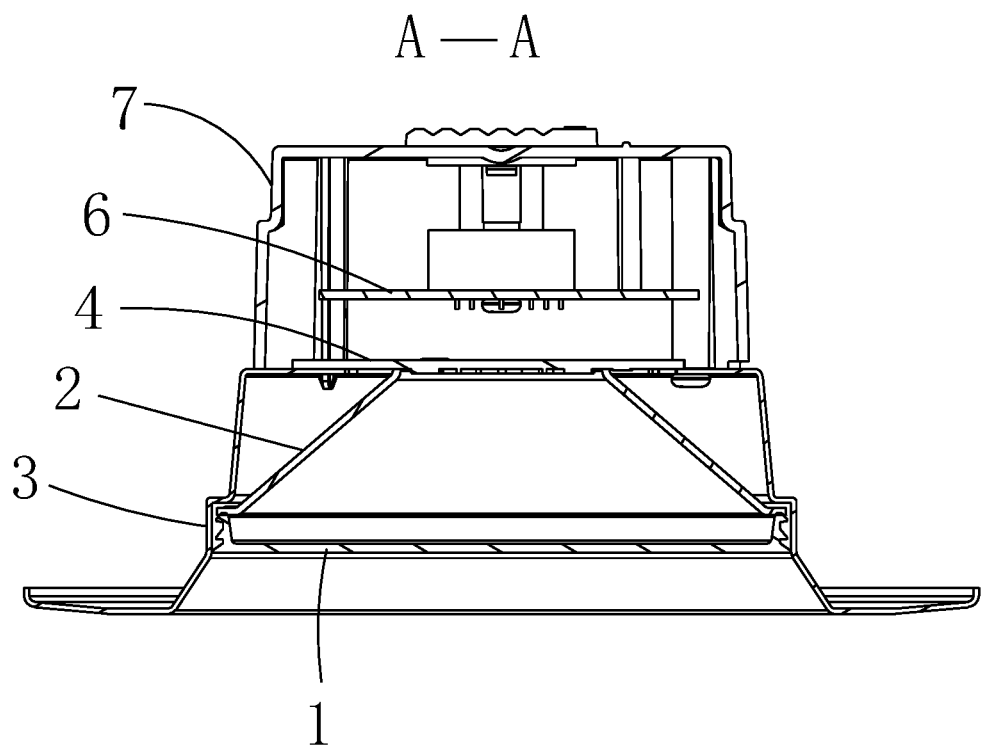
FIG. 4 illustrates a cross-sectional view of the example in FIG. 1.

FIG. 4 illustrates a cross-sectional view of the example in FIG. 1.

Figure 5:
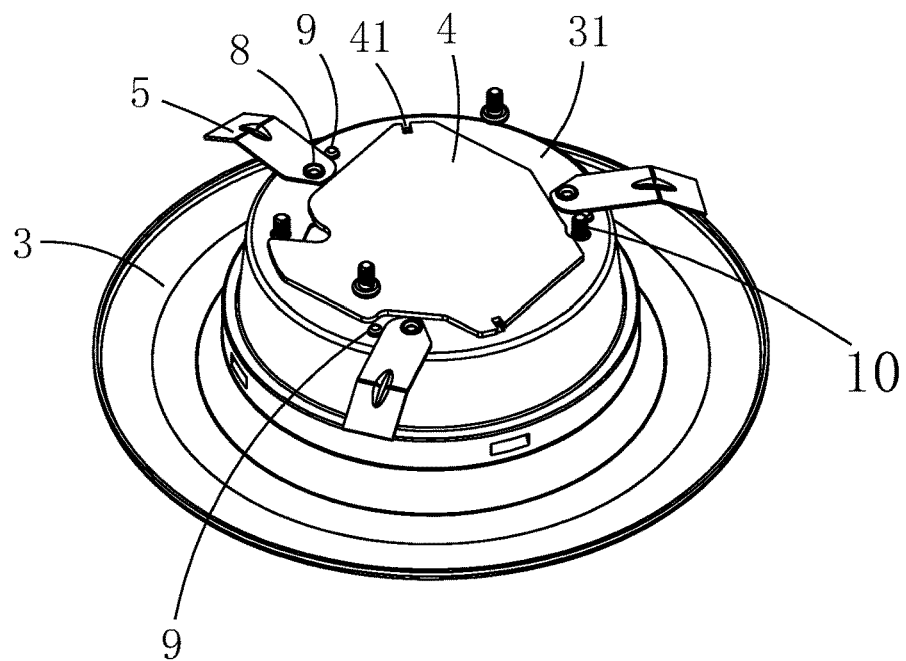
FIG. 5 illustrates a perspective view of the leaf spring and the light housing.

FIG. 5 illustrates a perspective view of the leaf spring and the light housing.

Figure 6:
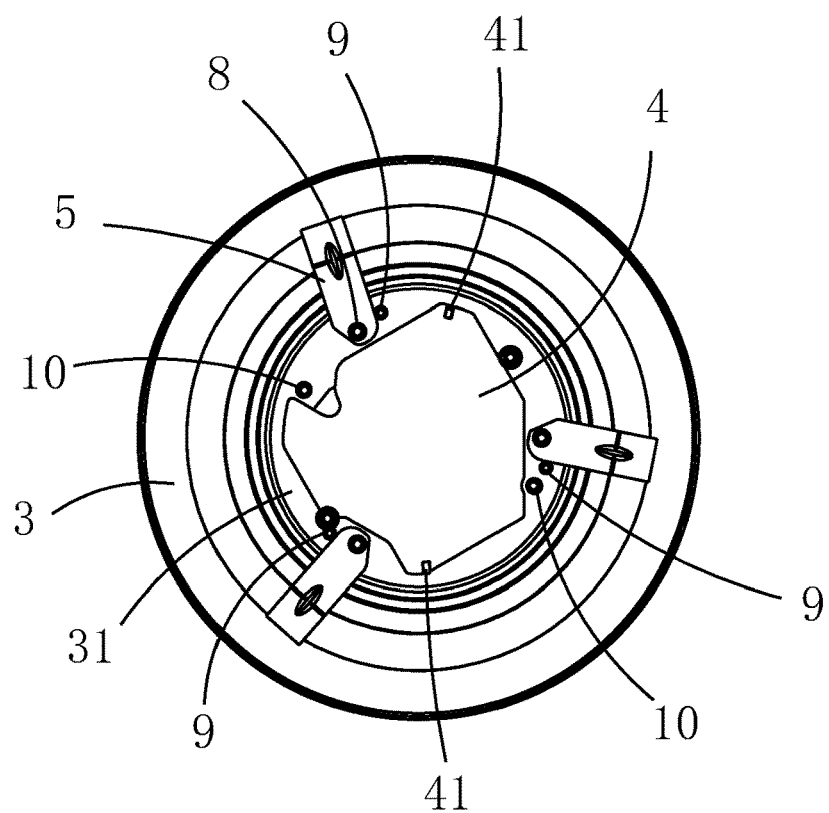
FIG. 6 illustrates a top view of the example in FIG. 5.

FIG. 6 illustrates a top view of the example in FIG. 5.

Figure 7:
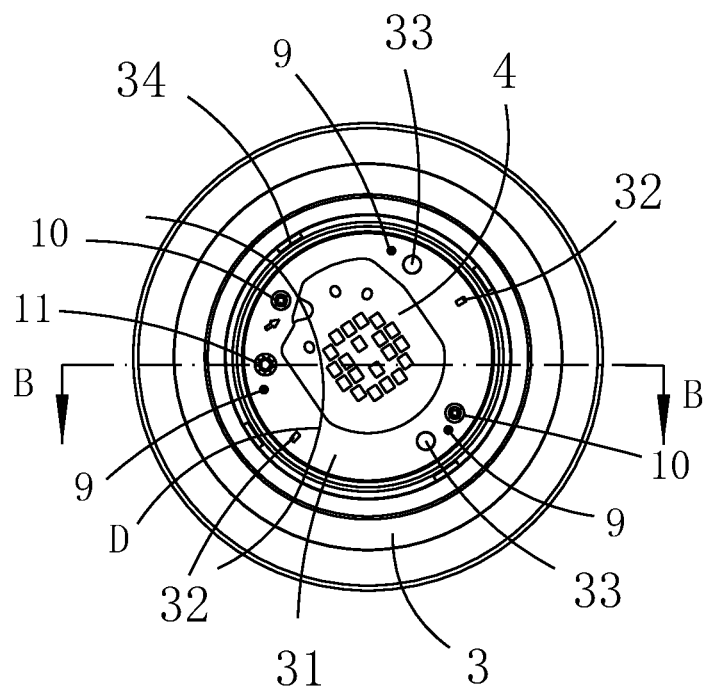
FIG. 7 illustrates a bottom view of the example in FIG. 5.

FIG. 7 illustrates a bottom view of the example in FIG. 5.

Figure 8:
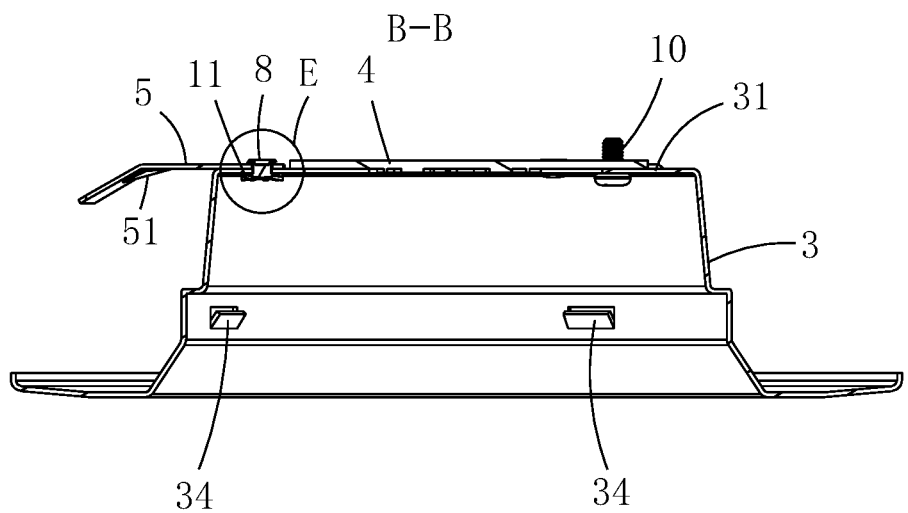
FIG. 8 illustrates a side view of the example in FIG. 5.

FIG. 8 illustrates a side view of the example in FIG. 5.

Figure 9:
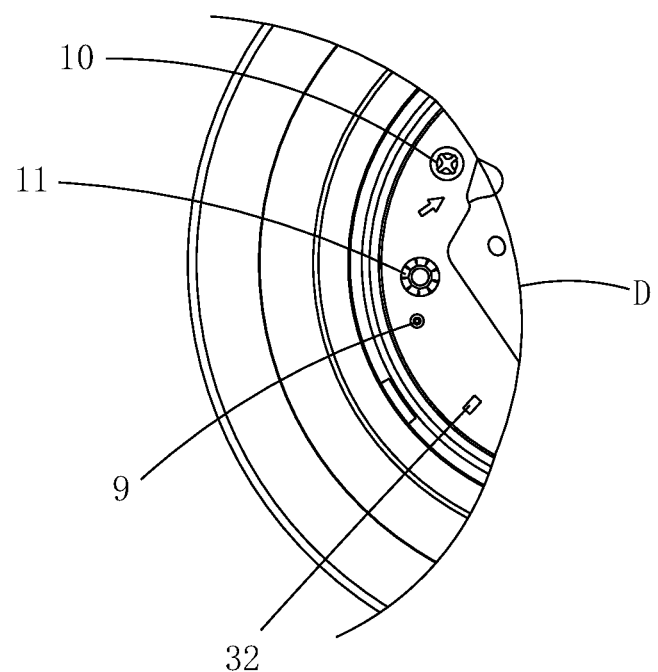
FIG. 9 illustrates a zoom-up view of a portion of the example in FIG. 5.

FIG. 9 illustrates a zoom-up view of a portion of the example in FIG. 5.

Figure 10:
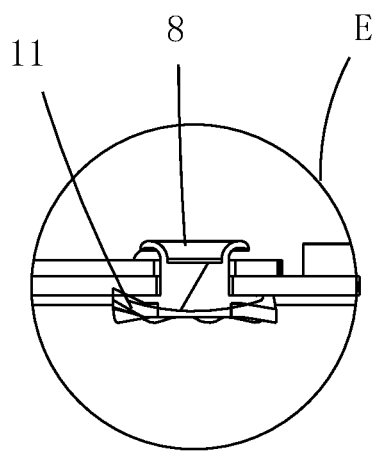
FIG. 10 illustrates a zoom-up view of a connection among multiple components.

FIG. 10 illustrates a zoom-up view of a connection among multiple components.

Figure 11:
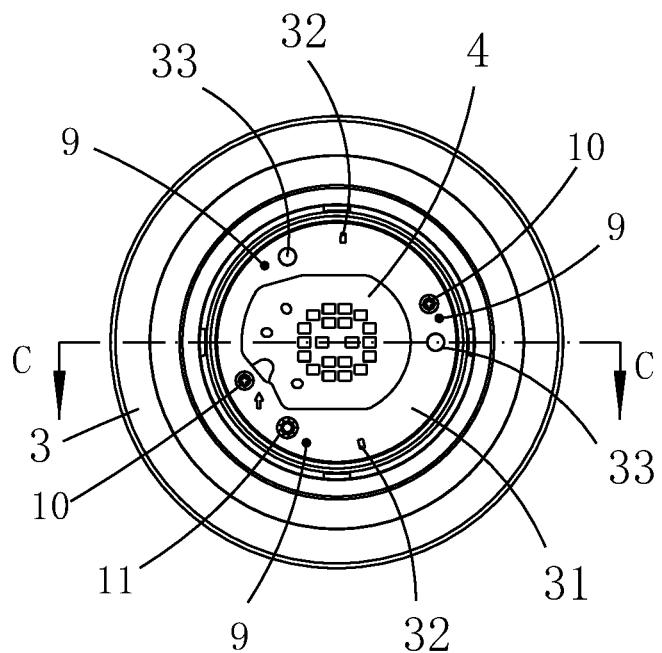
FIG. 11 illustrates another bottom view of another example.

FIG. 11 illustrates another bottom view of another example.

Figure 12:
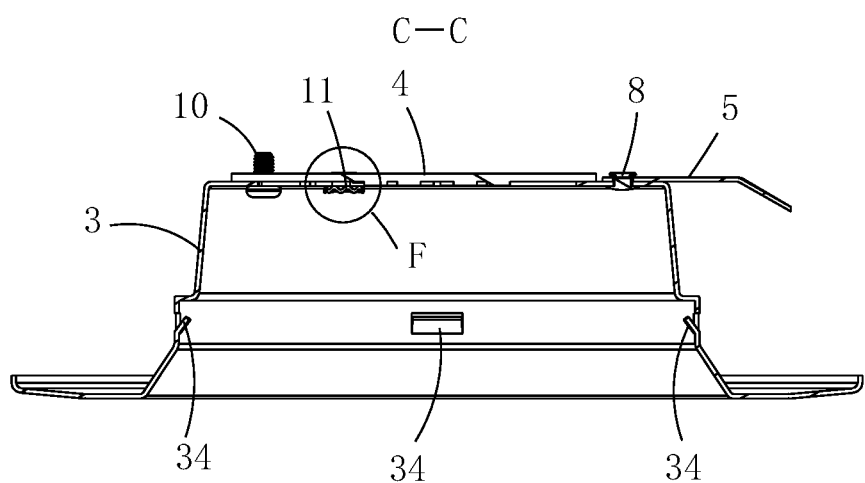
FIG. 12 illustrates a side view of another example.

FIG. 12 illustrates a side view of another example.

Figure 13:
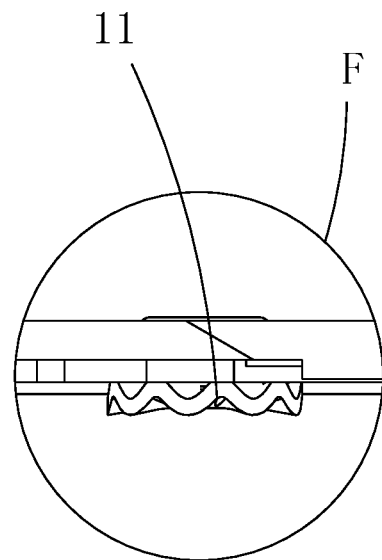
FIG. 13 illustrates a wave structure pad example.

FIG. 13 illustrates a wave structure pad example.

Figure 14:
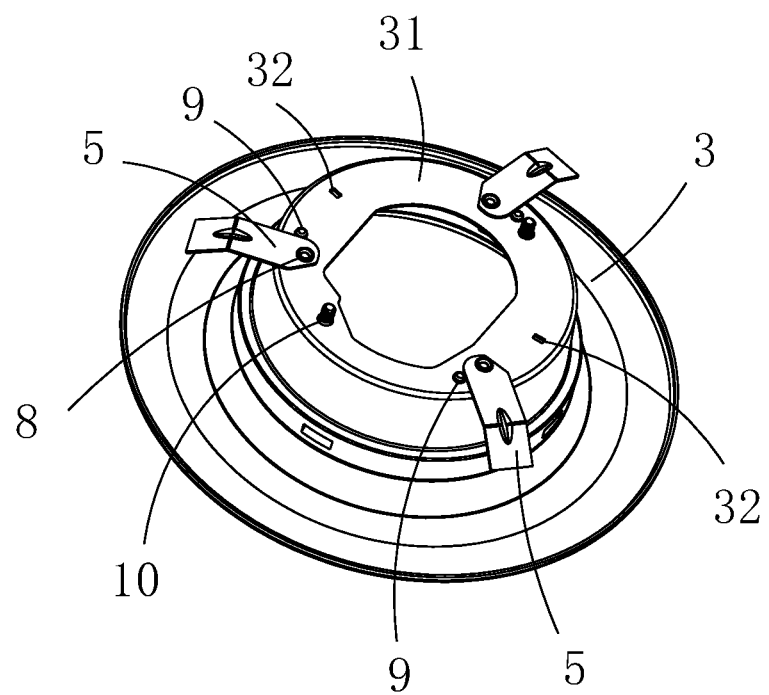
FIG. 14 illustrates another example of a light housing.

FIG. 14 illustrates another example of a light housing.

Figure 15:
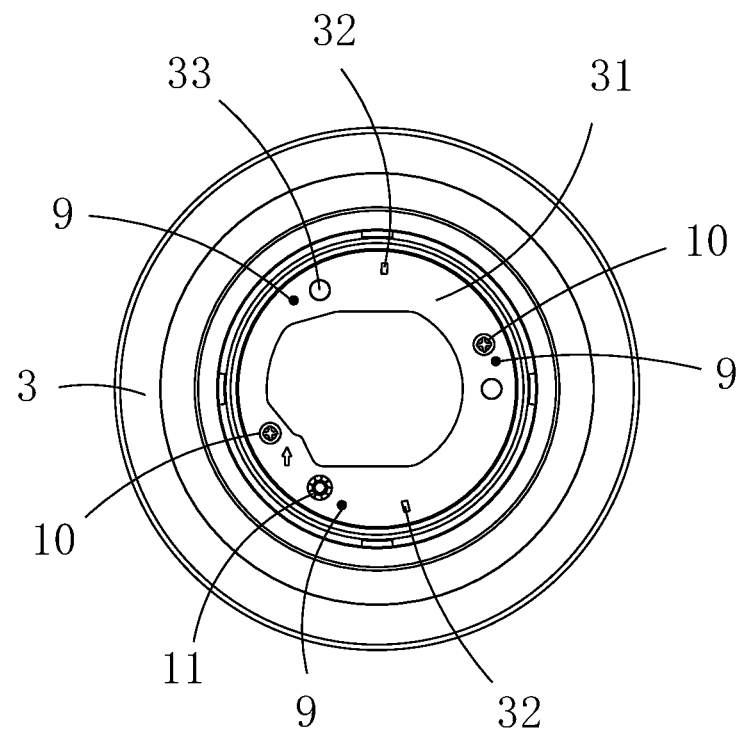
FIG. 15 illustrates a top view of the example in FIG. 14.

FIG. 15 illustrates a top view of the example in FIG. 14.

Figure 16:
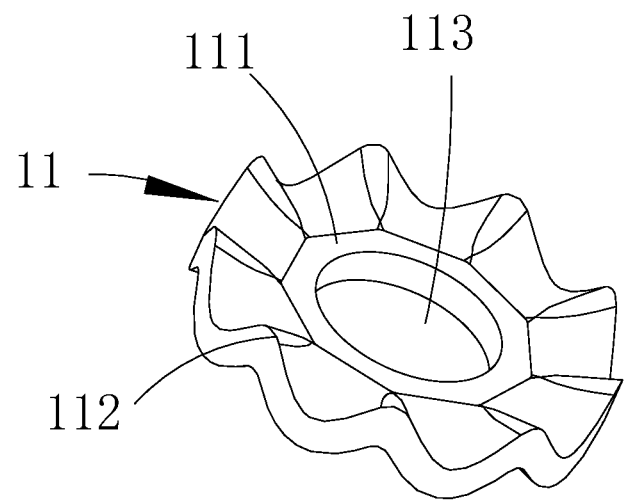
FIG. 16 illustrates an example of a wave structure pad.

FIG. 16 illustrates an example of a wave structure pad.

Figure 17:
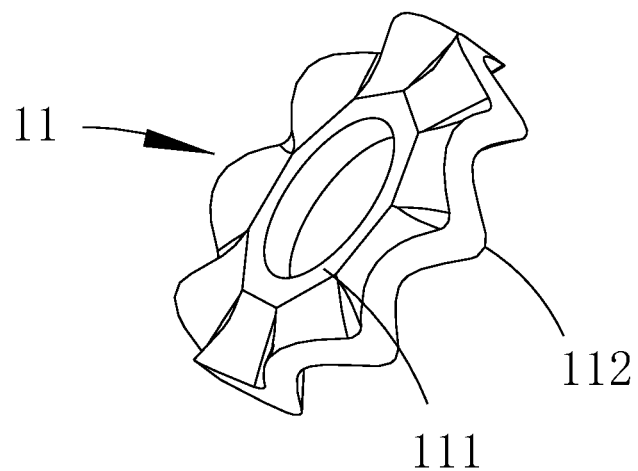
FIG. 17 illustrates another view of the example in FIG. 16.

FIG. 17 illustrates another view of the example in FIG. 16.

Figure 18:
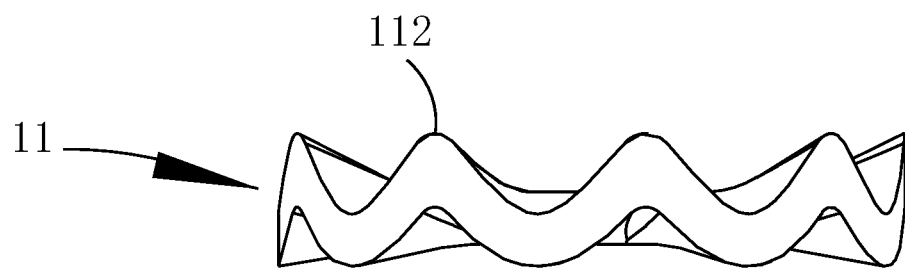
FIG. 18 illustrates another view of the example in FIG. 16.

FIG. 18 illustrates another view of the example in FIG. 16.

Figure 19:
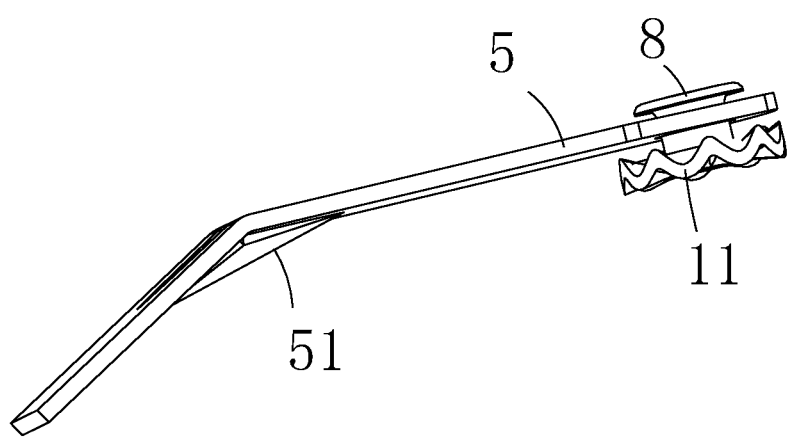
FIG. 19 illustrates a combination of the shaft connector, the leaf spring and the pad.

FIG. 19 illustrates a combination of the shaft connector, the leaf spring and the pad.

Figure 20:
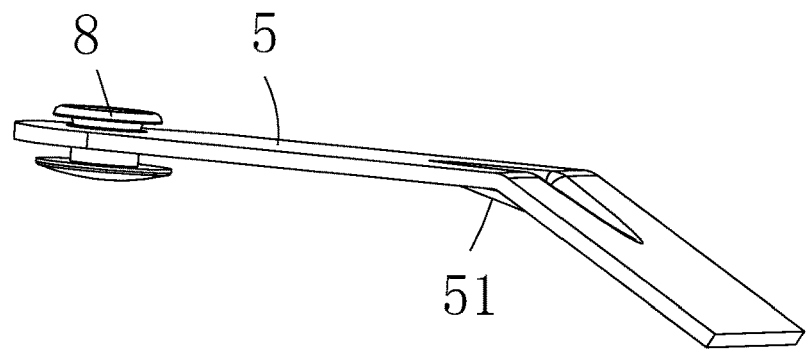
FIG. 20 illustrates another view of the example in FIG. 19.

FIG. 20 illustrates another view of the example in FIG. 19.

Figure 21:
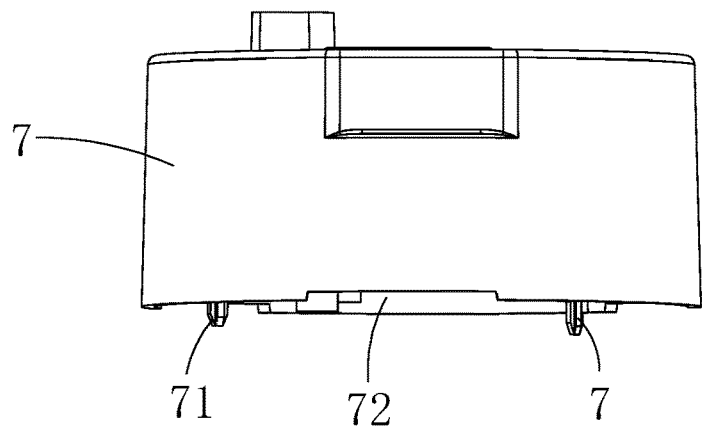
FIG. 21 illustrates a driver box example.

FIG. 21 illustrates a driver box example.

Figure 22:
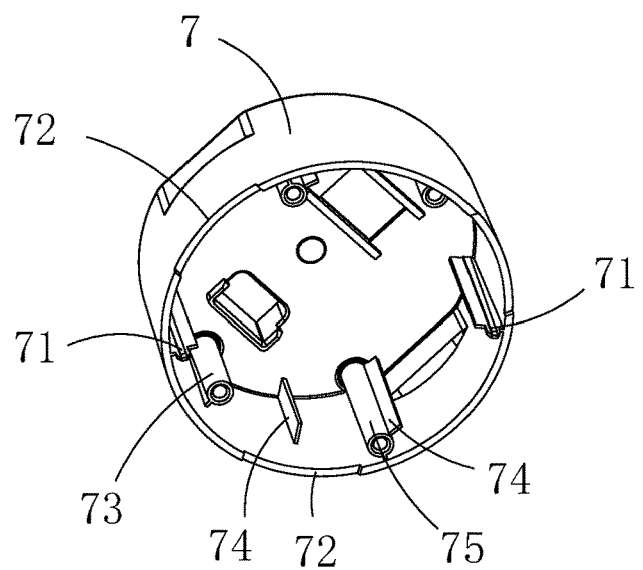
FIG. 22 illustrates another view of the example in FIG. 21.

FIG. 22 illustrates another view of the example in FIG. 21.

Figure 23:
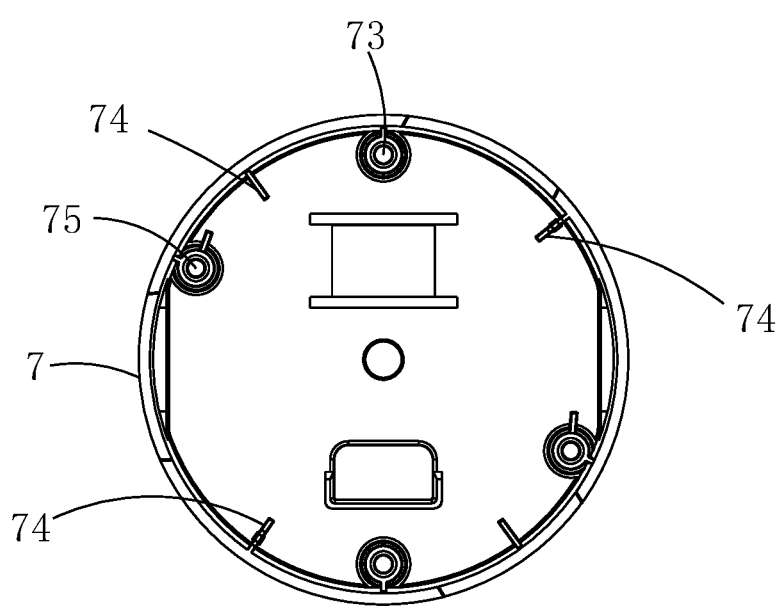
FIG. 23 illustrates another view of the example in FIG. 21.

FIG. 23 illustrates another view of the example in FIG. 21.

Figure 24:
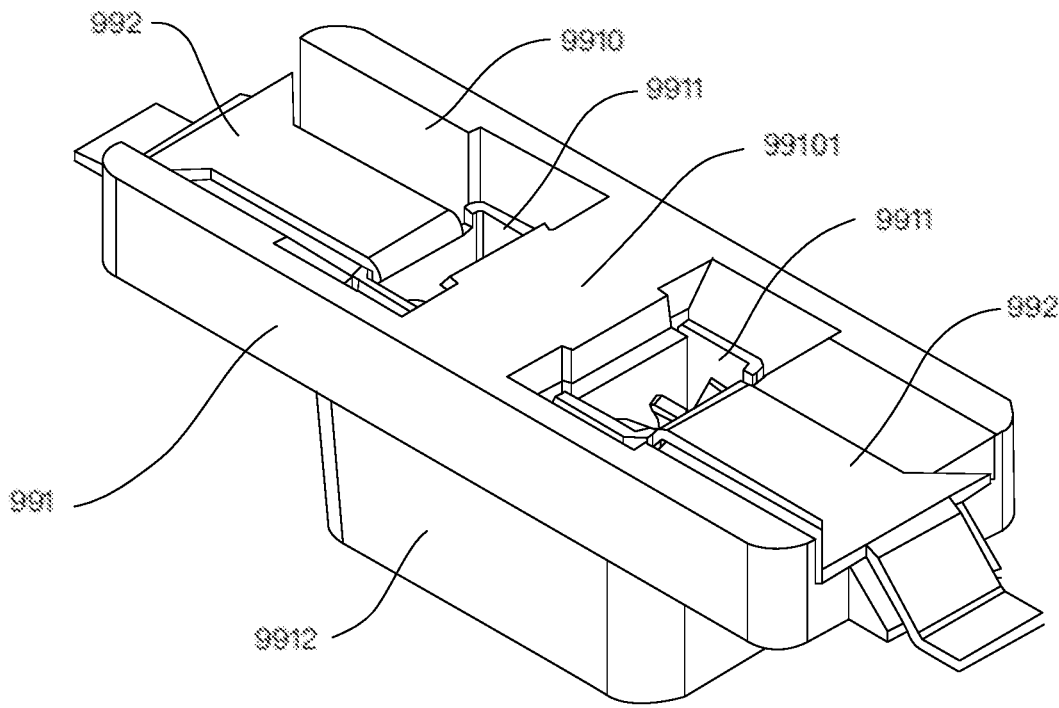
FIG. 24 illustrates a connector example.

FIG. 24 illustrates a connector example.

FIG. 25 illustrates a component in FIG. 24.

FIG. 26 illustrates another component in FIG. 24.

Figure 27:
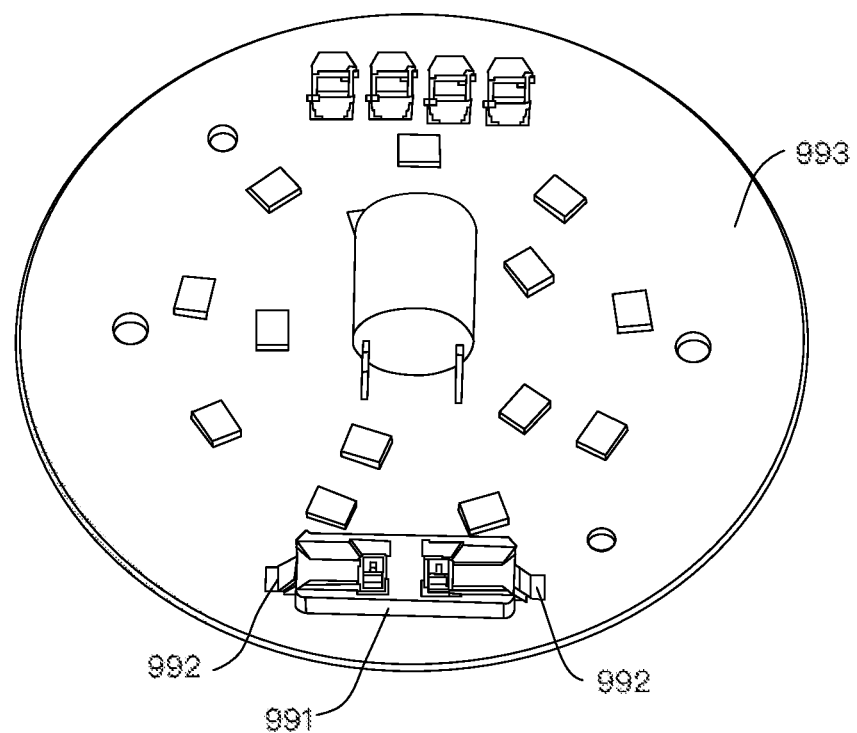
FIG. 27 illustrates the connector disposed on a light source plate.

FIG. 27 illustrates the connector disposed on a light source plate.

FIG. 28 illustrates an electricity distance diagram.

Figure 29:
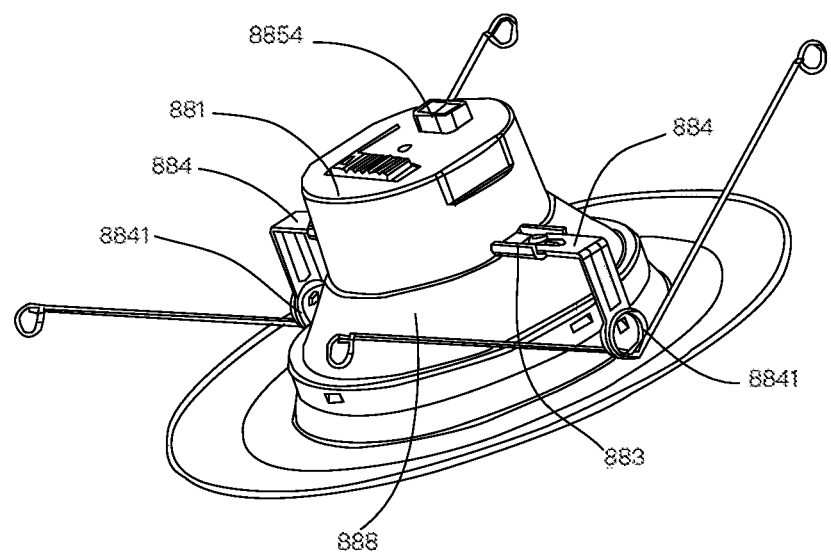
FIG. 29 illustrates another downlight example.

FIG. 29 illustrates another downlight example.

Figure 30:
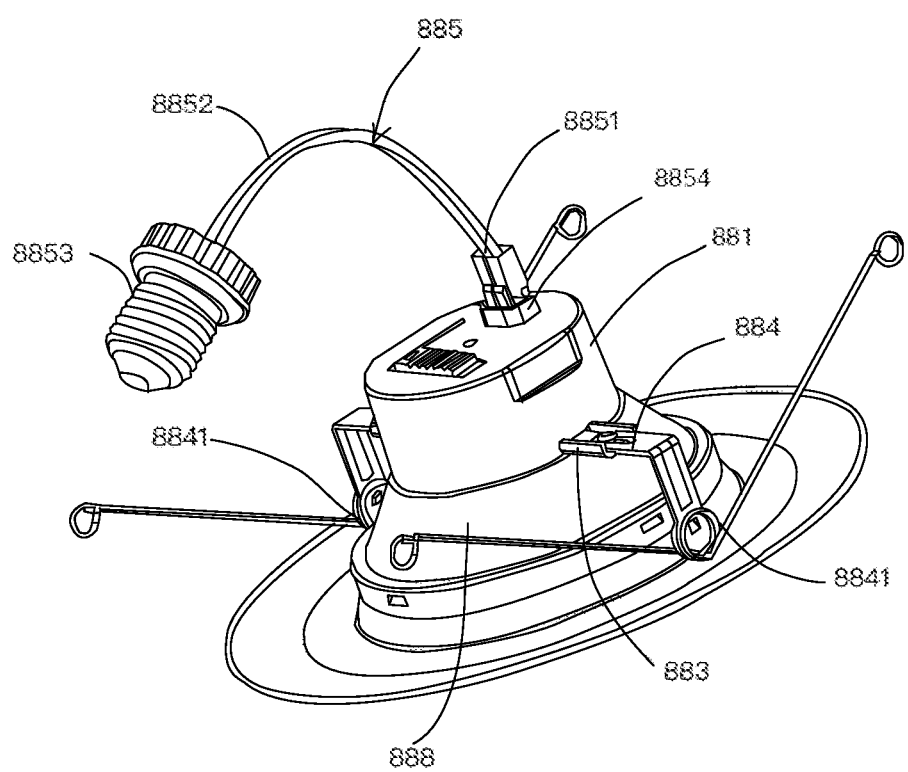
FIG. 30 illustrates the example in FIG. 29 with a wire connector.

FIG. 30 illustrates the example in FIG. 29 with a wire connector.

Figure 31:
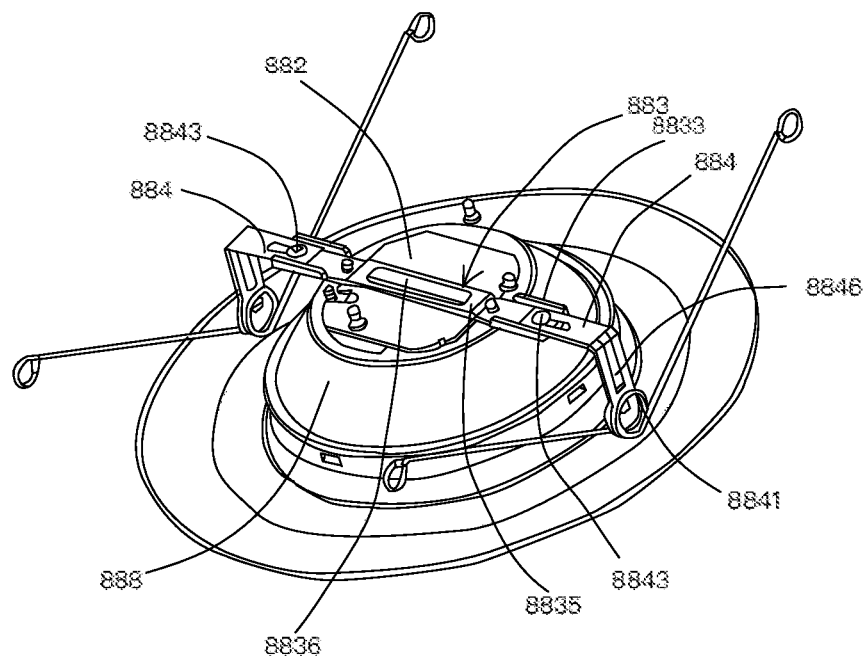
FIG. 31 illustrates a fixing bar placed on a light housing.

FIG. 31 illustrates a fixing bar placed on a light housing.

Figure 32:
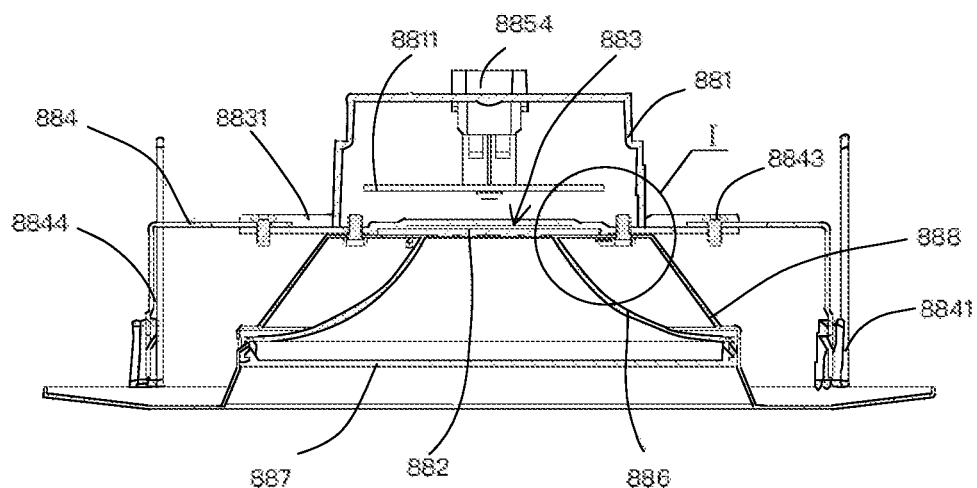
FIG. 32 illustrates a heat dissipation plate placed between a driver box and a light housing.

FIG. 32 illustrates a heat dissipation plate placed between a driver box and a light housing.

Figure 33:
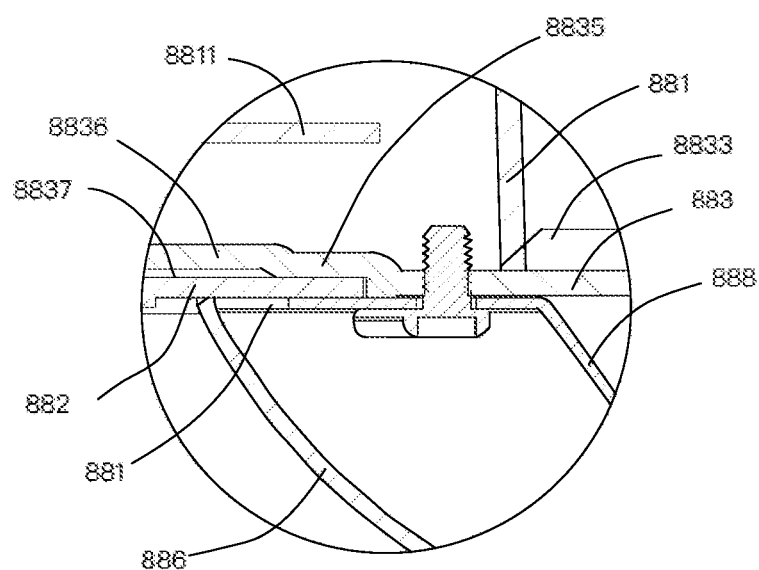
FIG. 33 illustrates a screw for transmitting heat.

FIG. 33 illustrates a screw for transmitting heat.

Figure 34:
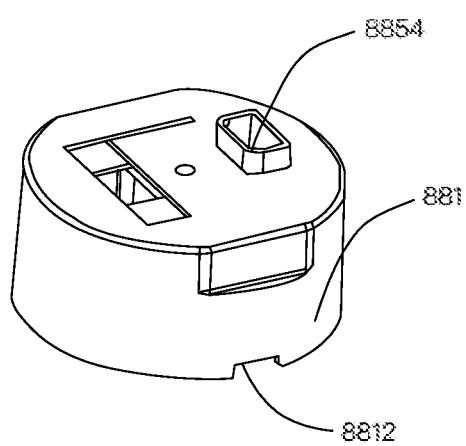
FIG. 34 illustrates a driver box example.

FIG. 34 illustrates a driver box example.

Figure 35:
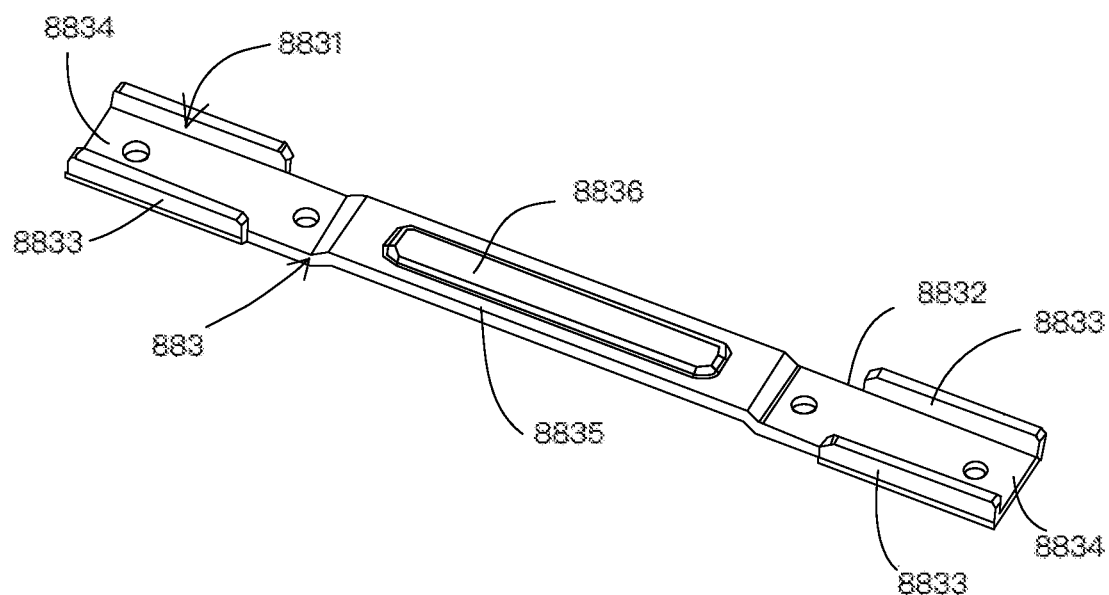
FIG. 35 illustrates a heat dissipation plate in an elongated form.

FIG. 35 illustrates a heat dissipation plate in an elongated form.

Figure 36:
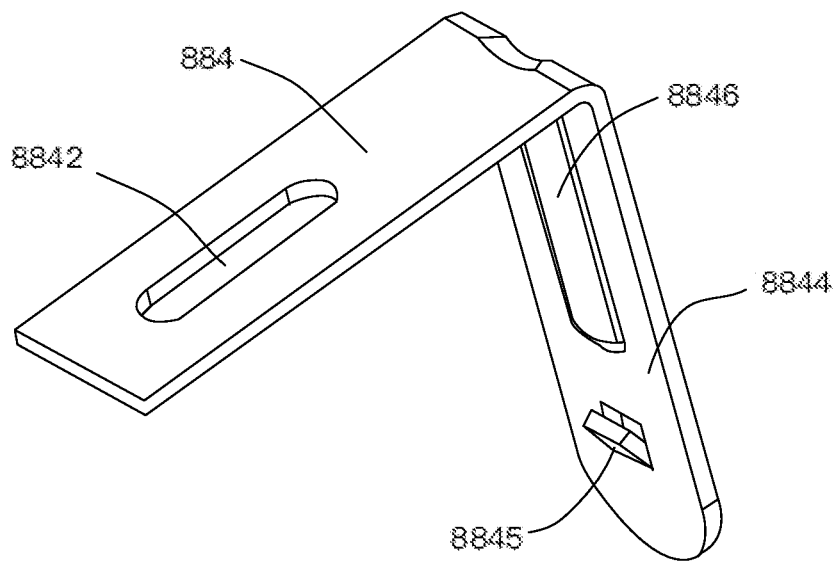
FIG. 36 illustrates a connector for connecting components.

FIG. 36 illustrates a connector for connecting components.

Figure 37:
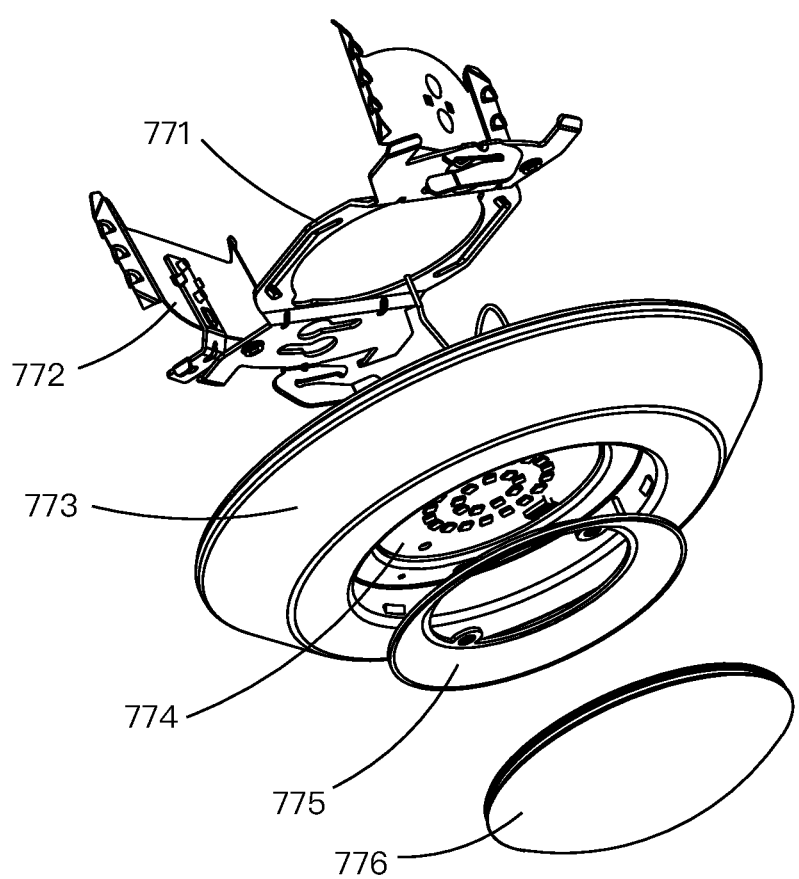
FIG. 37 illustrates an exploded view of another downlight embodiment.

FIG. 37 illustrates an exploded view of another downlight embodiment.

Figure 38:
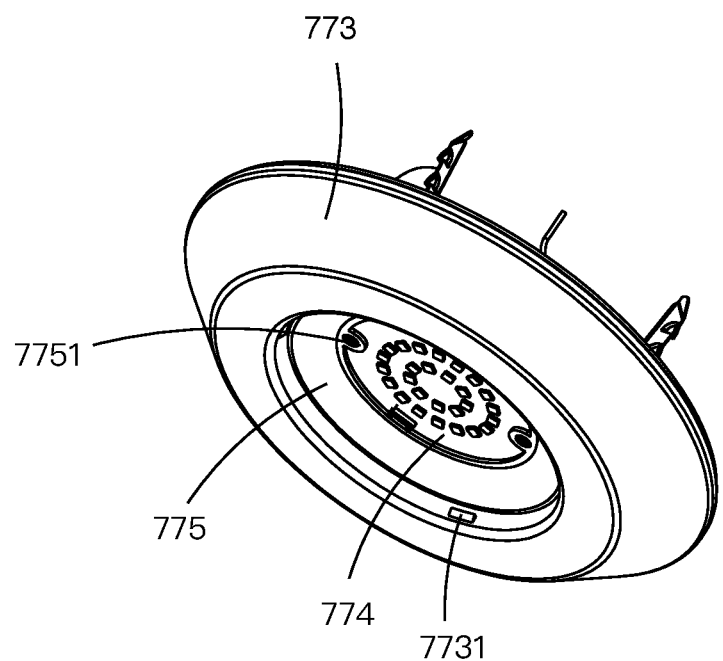
FIG. 38 illustrates a component in the example of FIG. 37.

FIG. 38 illustrates a component in the example of FIG. 37.

Figure 39:
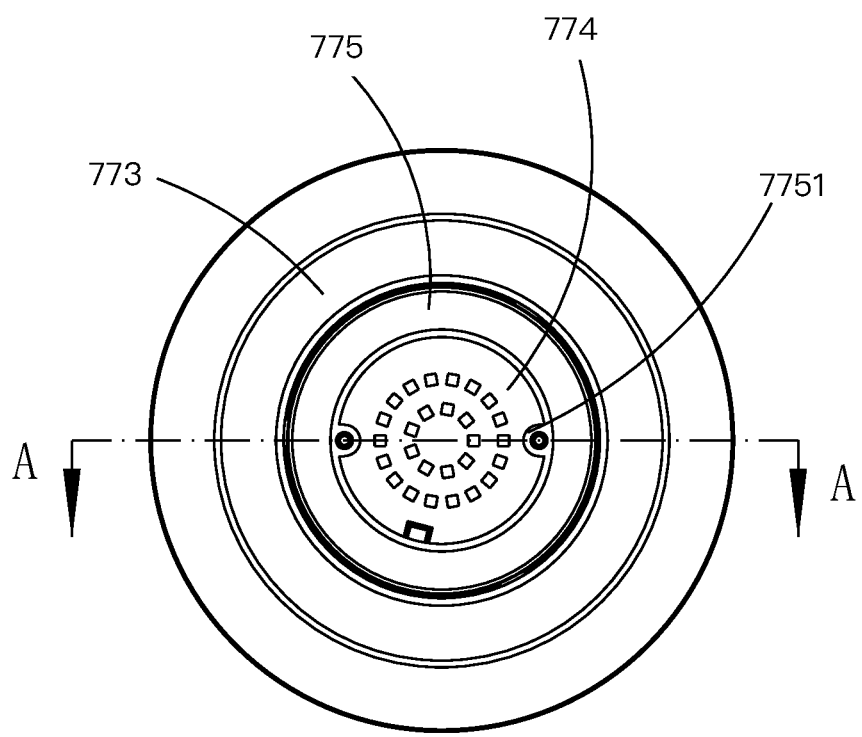
FIG. 39 illustrates a bottom view of the example in FIG. 37.

FIG. 39 illustrates a bottom view of the example in FIG. 37.

Figure 40:
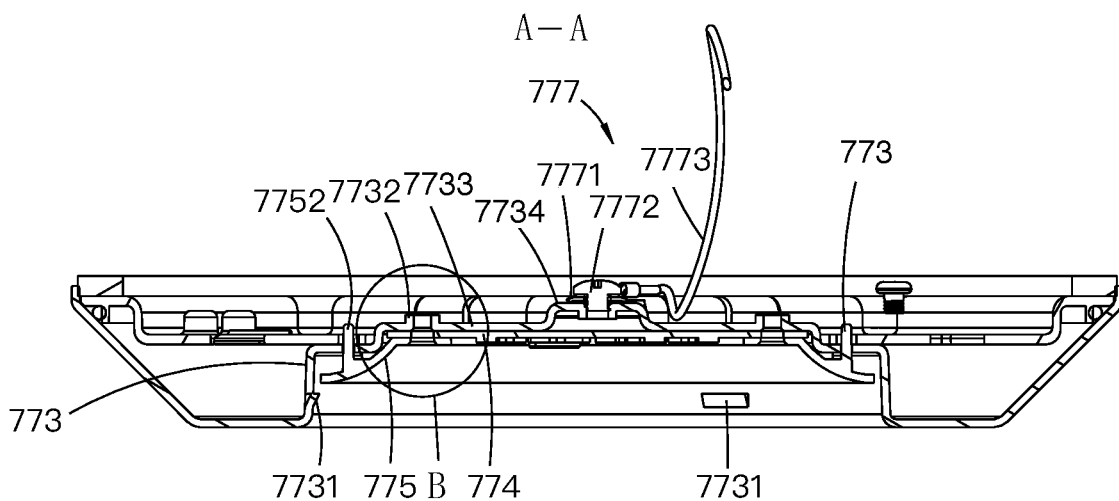
FIG. 40 illustrates another example in a cross-sectional view.

FIG. 40 illustrates another example in a cross-sectional view.

Figure 41:
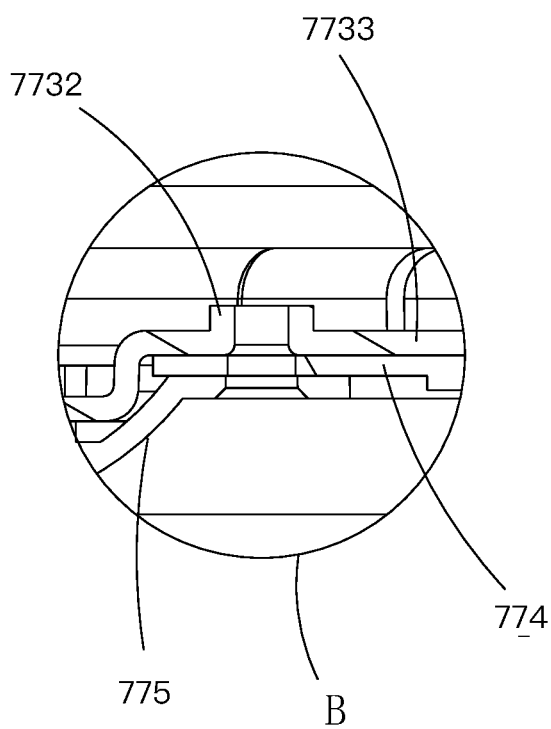
FIG. 41 illustrates a zoom-up view of a connection between components.

FIG. 41 illustrates a zoom-up view of a connection between components.

Figure 42:
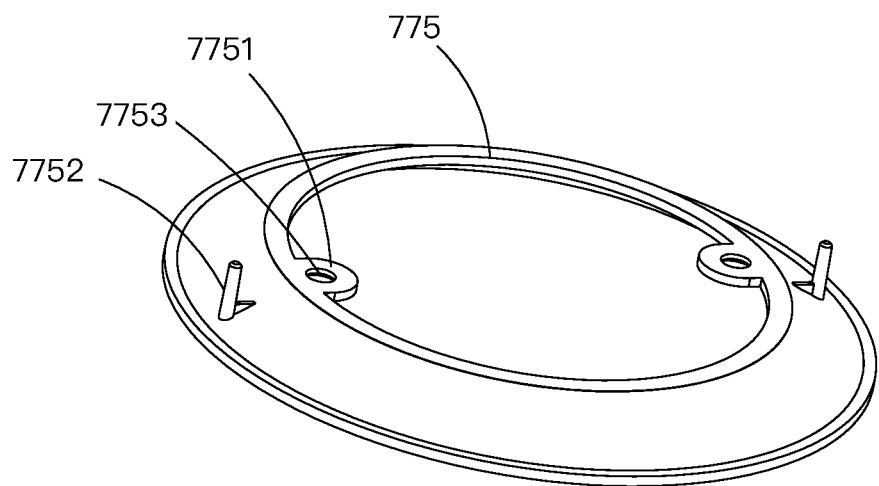
FIG. 42 illustrates a reflective cup example.

FIG. 42 illustrates a reflective cup example.

Figure 43:
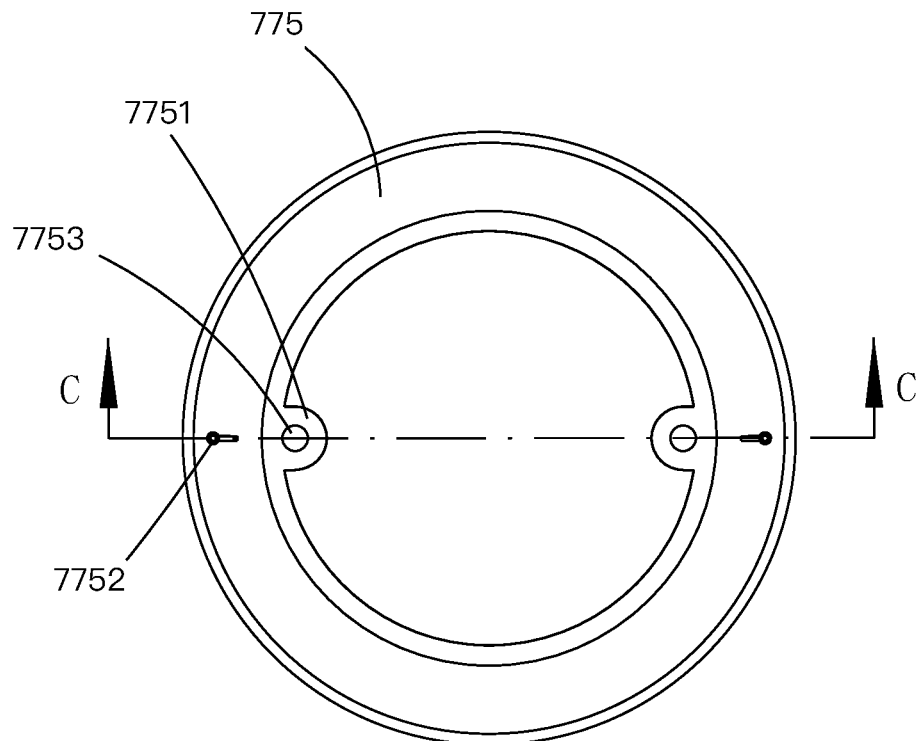
FIG. 43 illustrates a top view of the example in FIG. 42.

FIG. 43 illustrates a top view of the example in FIG. 42.

Figure 44:
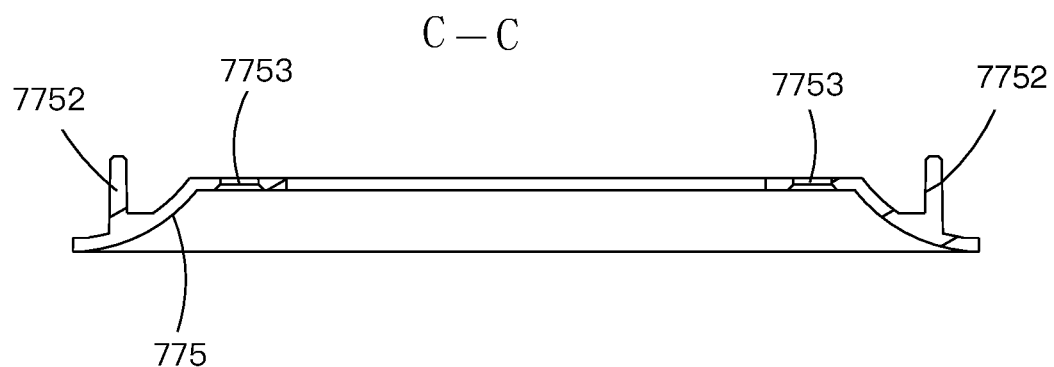
FIG. 44 illustrates a side view of the example in FIG. 42.

FIG. 44 illustrates a side view of the example in FIG. 42.

Figure 45:
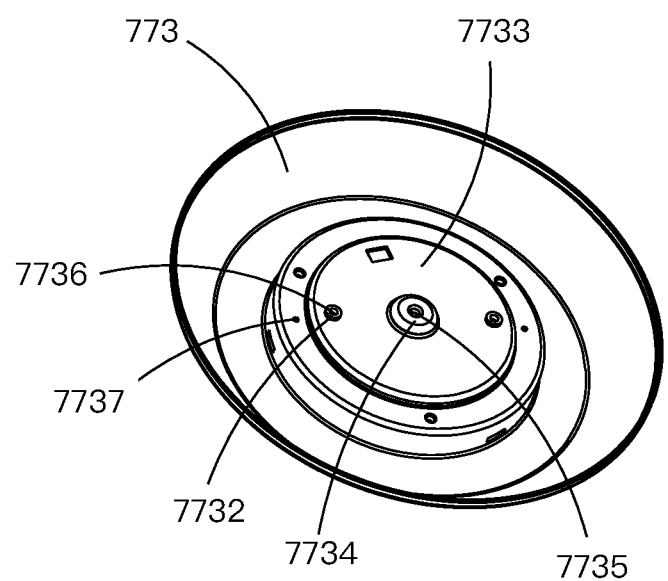
FIG. 45 illustrates a top view of a light housing.

FIG. 45 illustrates a top view of a light housing.

Figure 46:
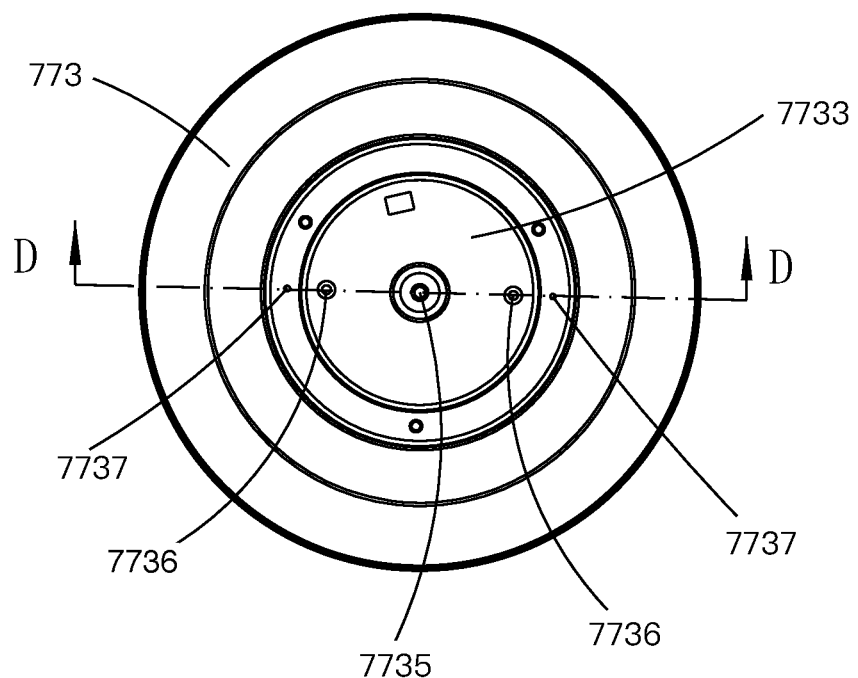
FIG. 46 illustrates another top view of the light housing example in FIG. 45.

FIG. 46 illustrates another top view of the light housing example in FIG. 45.

Figure 47:
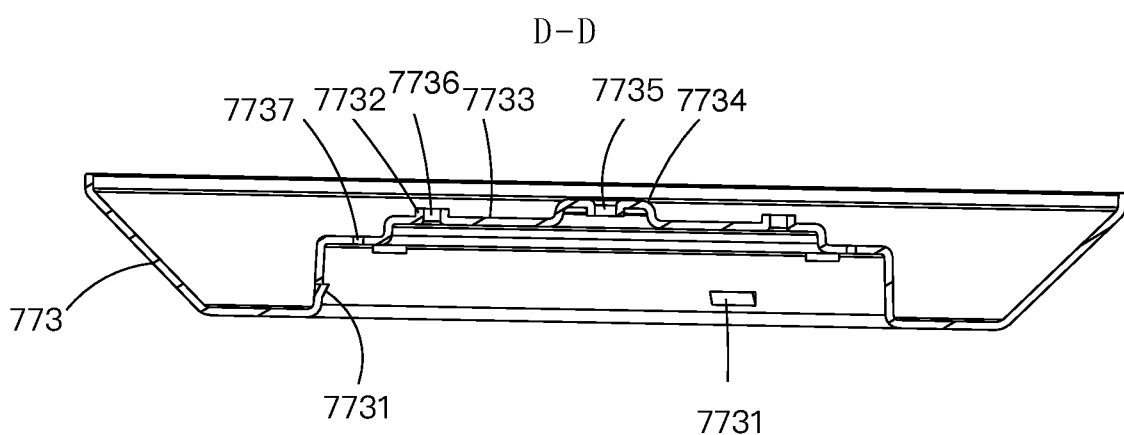
FIG. 47 illustrates a cross-sectional view of the example in FIG. 46.

FIG. 47 illustrates a cross-sectional view of the example in FIG. 46.

Figure 48:
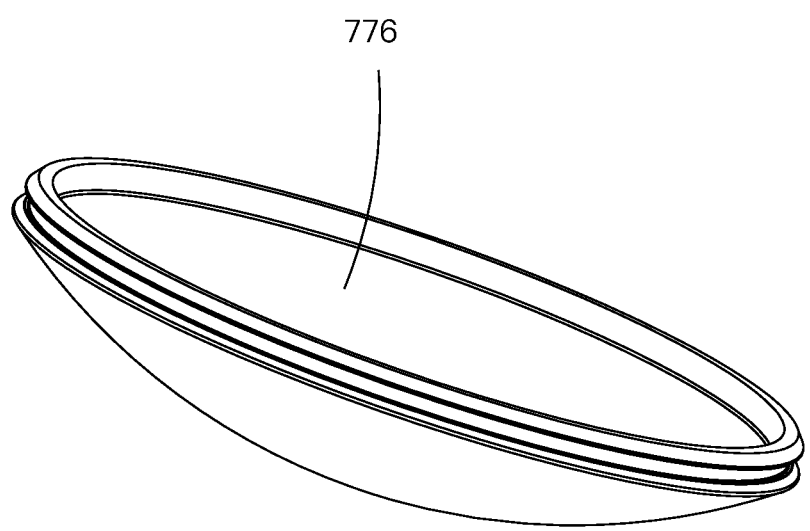
FIG. 48 illustrates a diffusion cover.

FIG. 48 illustrates a diffusion cover.

Figure 49:
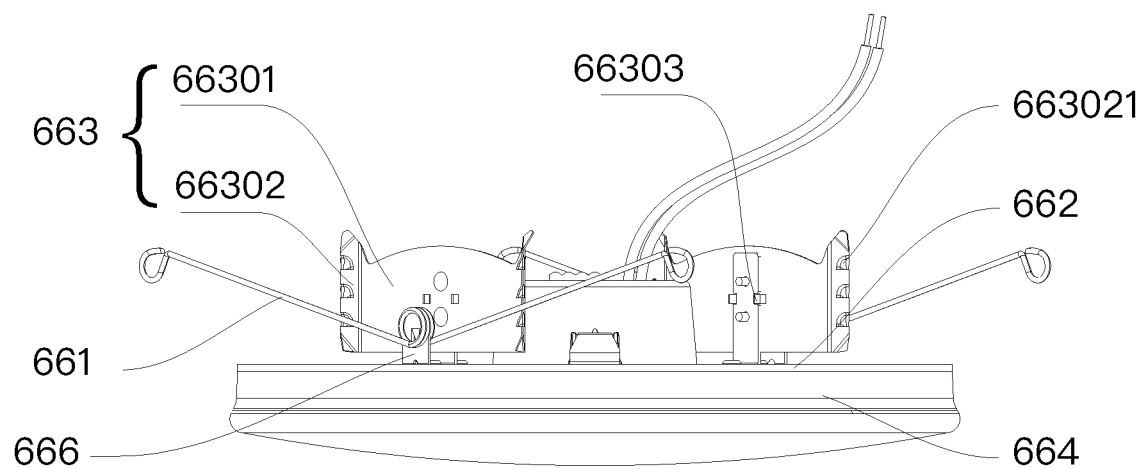
FIG. 49 illustrates a side view of a downlight example.

FIG. 49 illustrates a side view of a downlight example.

Figure 50:
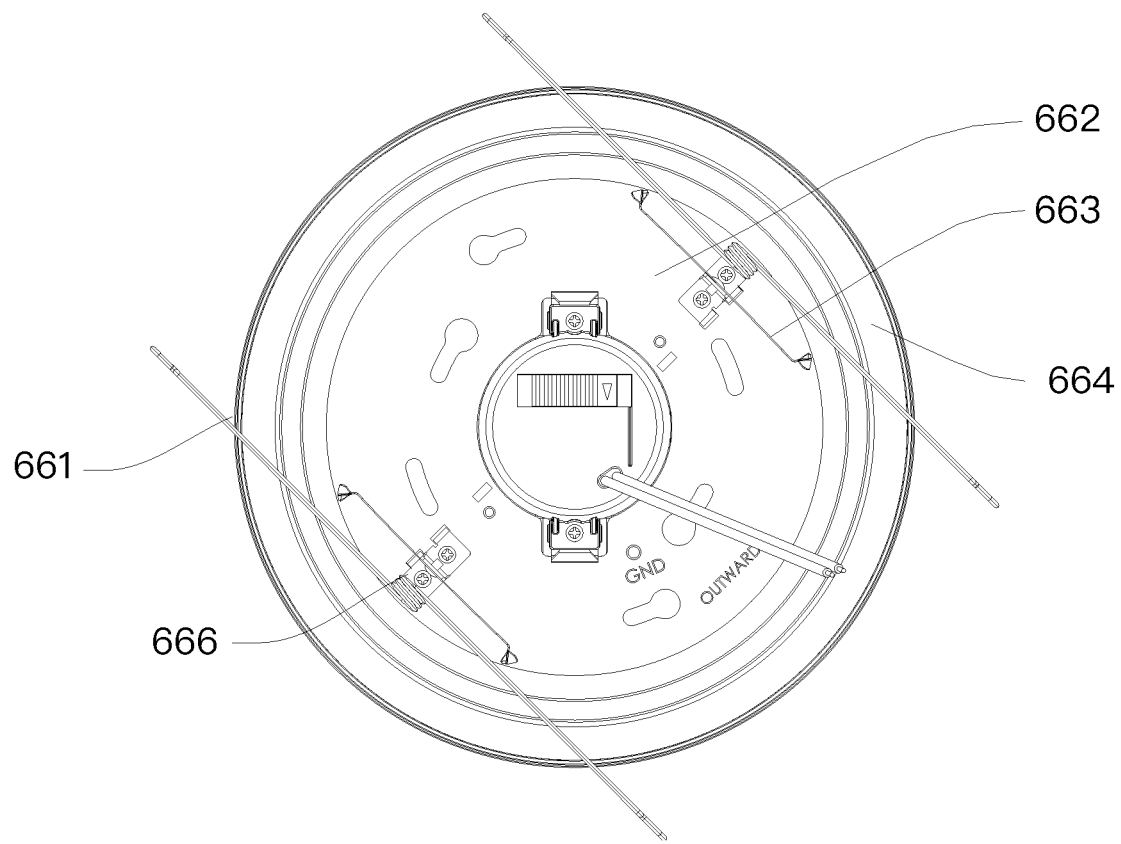
FIG. 50 illustrates a top view of the example in FIG. 49.

FIG. 50 illustrates a top view of the example in FIG. 49.

Figure 51:
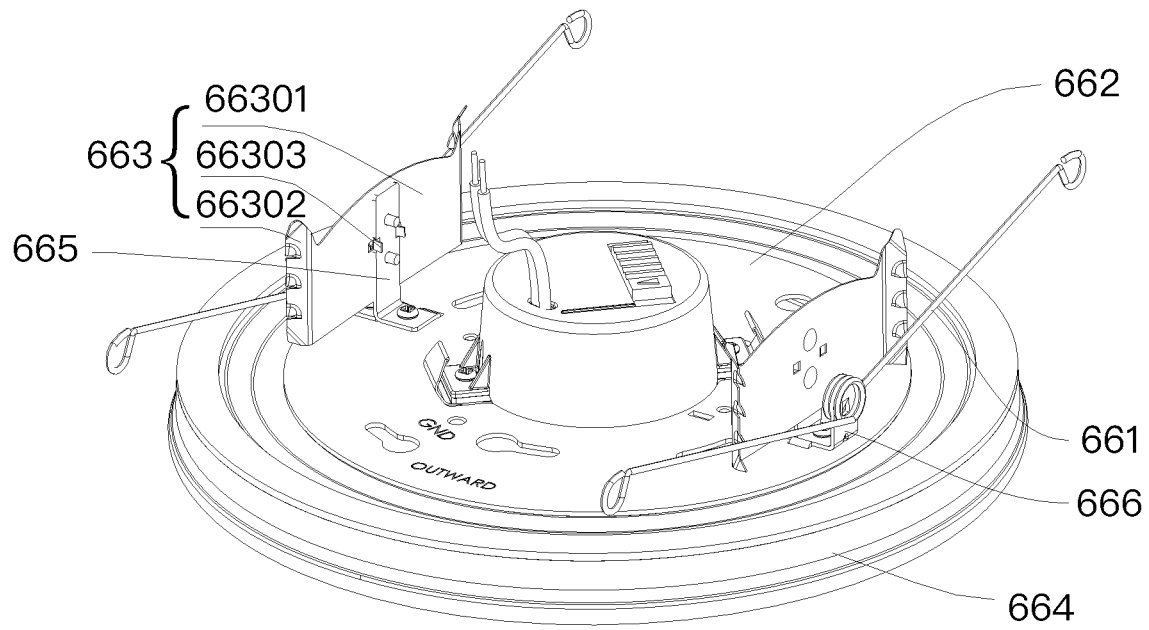
FIG. 51 illustrates another view of the example in FIG. 50.

FIG. 51 illustrates another view of the example in FIG. 50.

Figure 52:
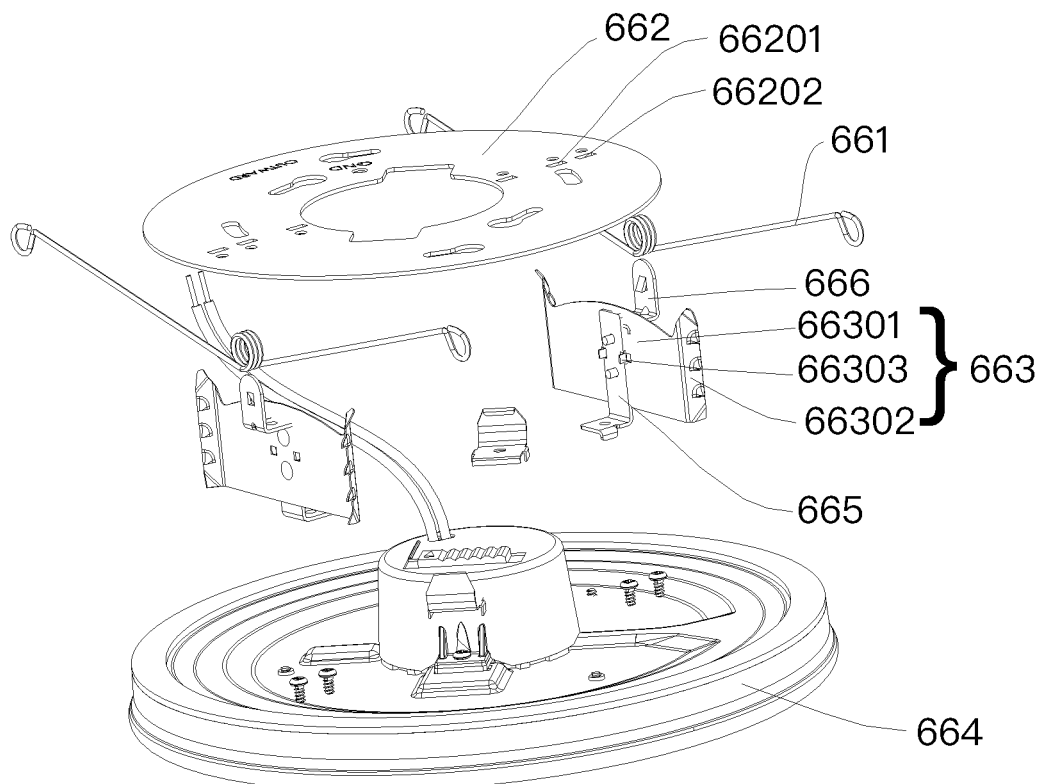
FIG. 52 illustrates an exploded view of the example in FIG. 51.

FIG. 52 illustrates an exploded view of the example in FIG. 51.

Figure 53:
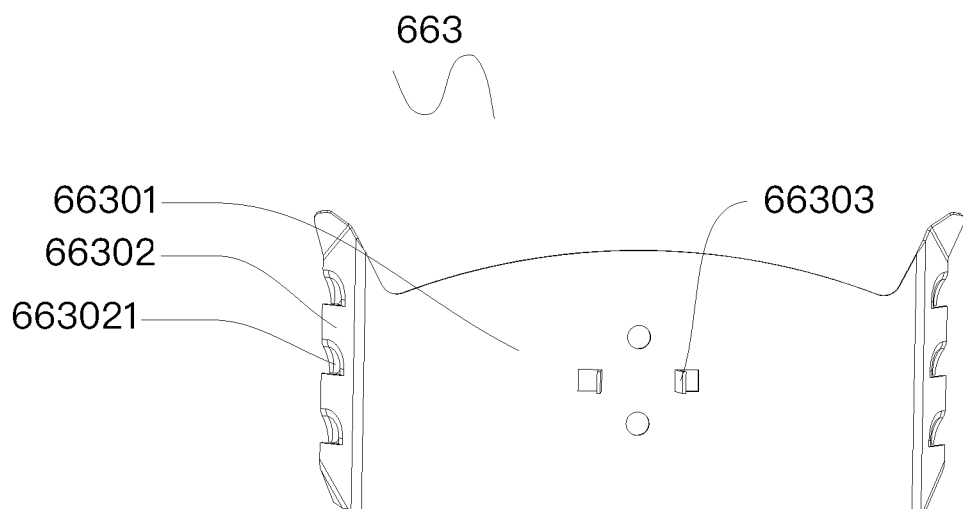
FIG. 53 illustrates an elastic plate example.

FIG. 53 illustrates an elastic plate example.

Figure 54:
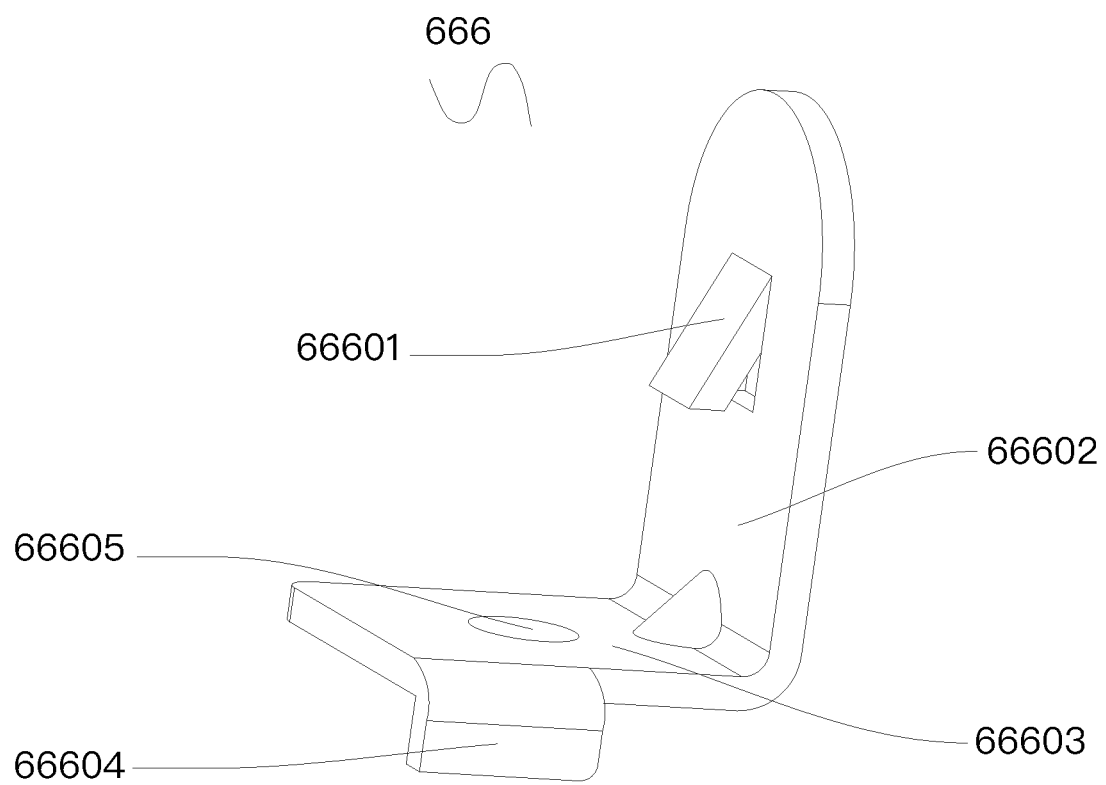
FIG. 54 illustrates a connector example.

FIG. 54 illustrates a connector example.

Figure 55:
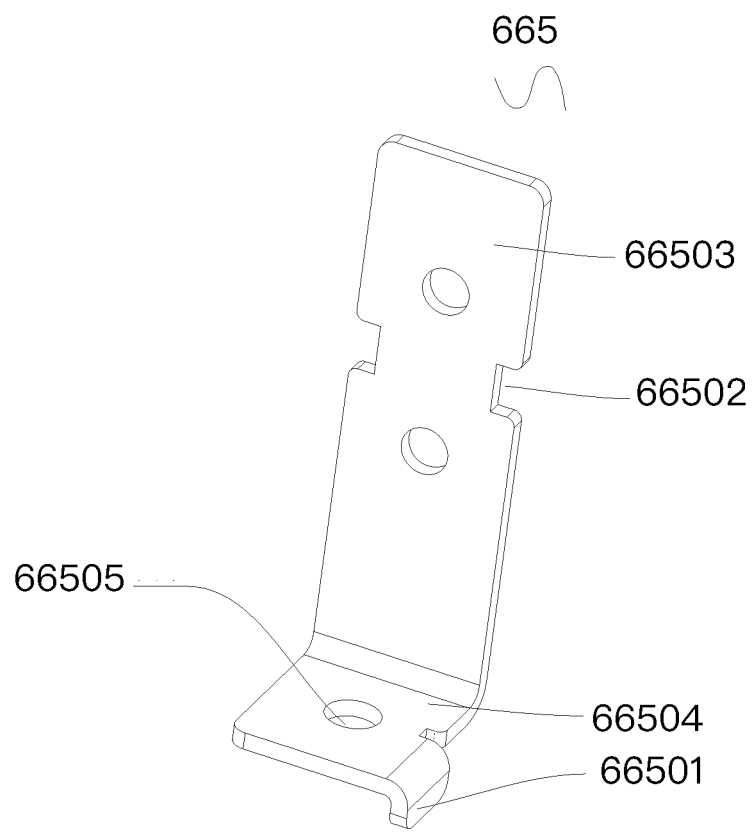
FIG. 55 illustrates another connector example.

FIG. 55 illustrates another connector example.

Figure 56:
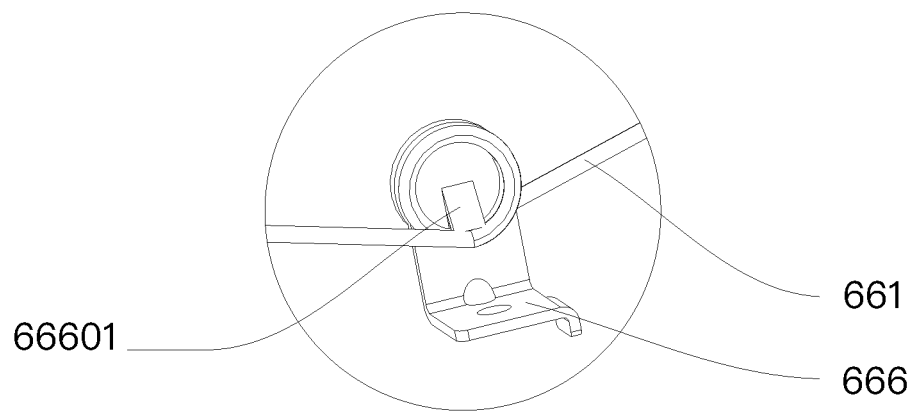
FIG. 56 illustrates a torsion spring zoom-up view.

FIG. 56 illustrates a torsion spring zoom-up view.

Figure 57:
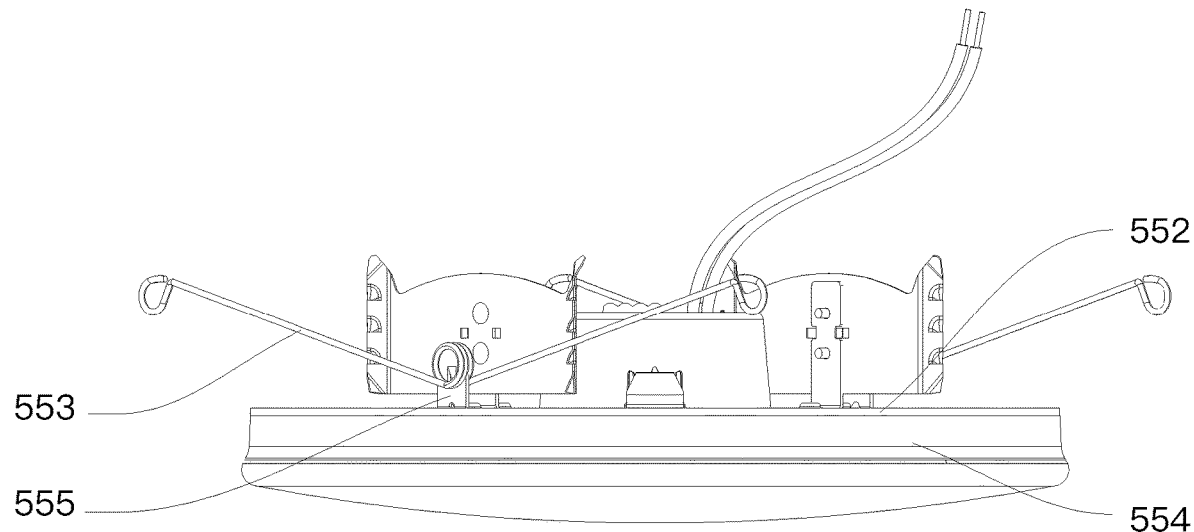
FIG. 57 illustrates another downlight example.

FIG. 57 illustrates another downlight example.

Figure 58:
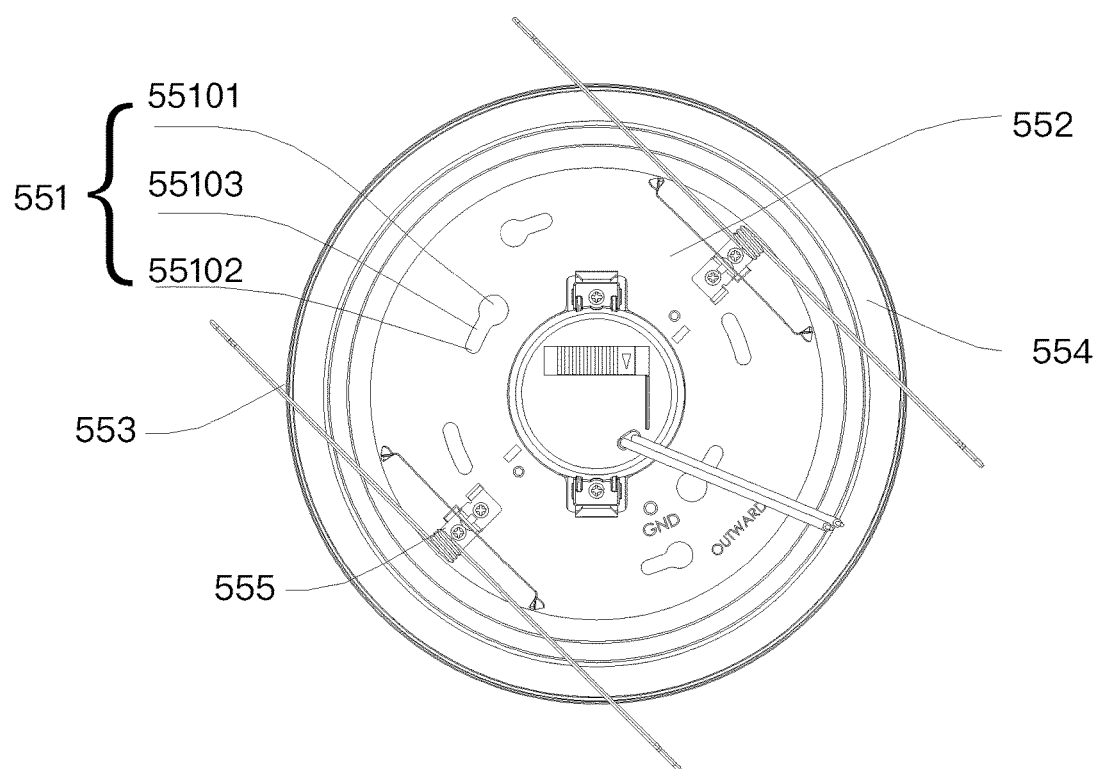
FIG. 58 illustrates a top view of the example in FIG. 57.

FIG. 58 illustrates a top view of the example in FIG. 57.

Figure 59:
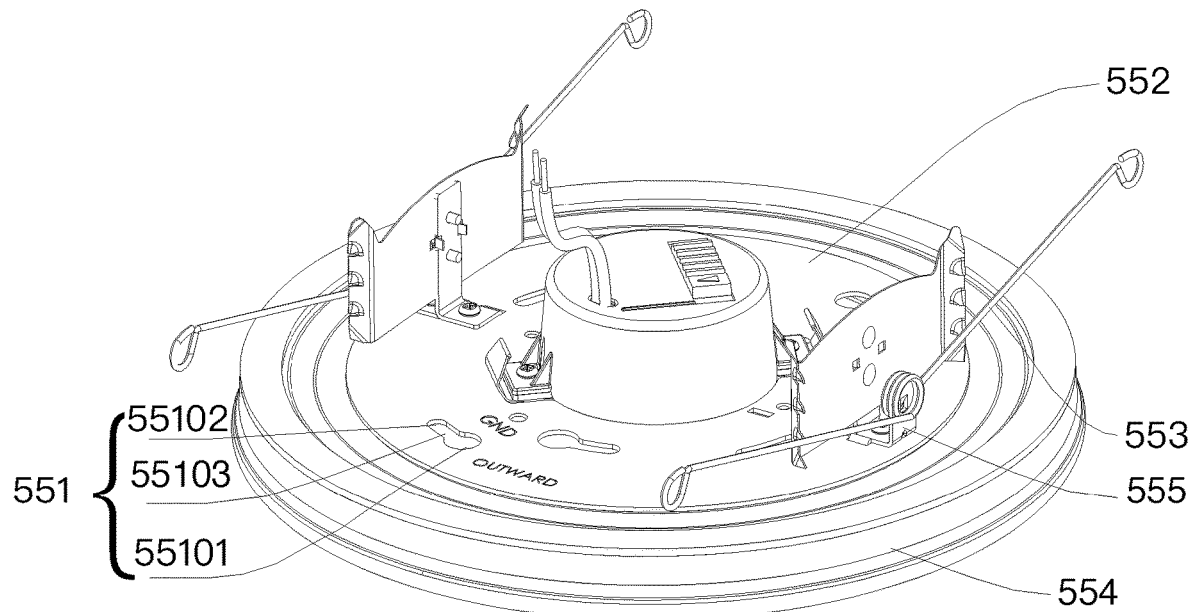
FIG. 59 illustrates another view of the example in FIG. 58.

FIG. 59 illustrates another view of the example in FIG. 58.

Figure 60:
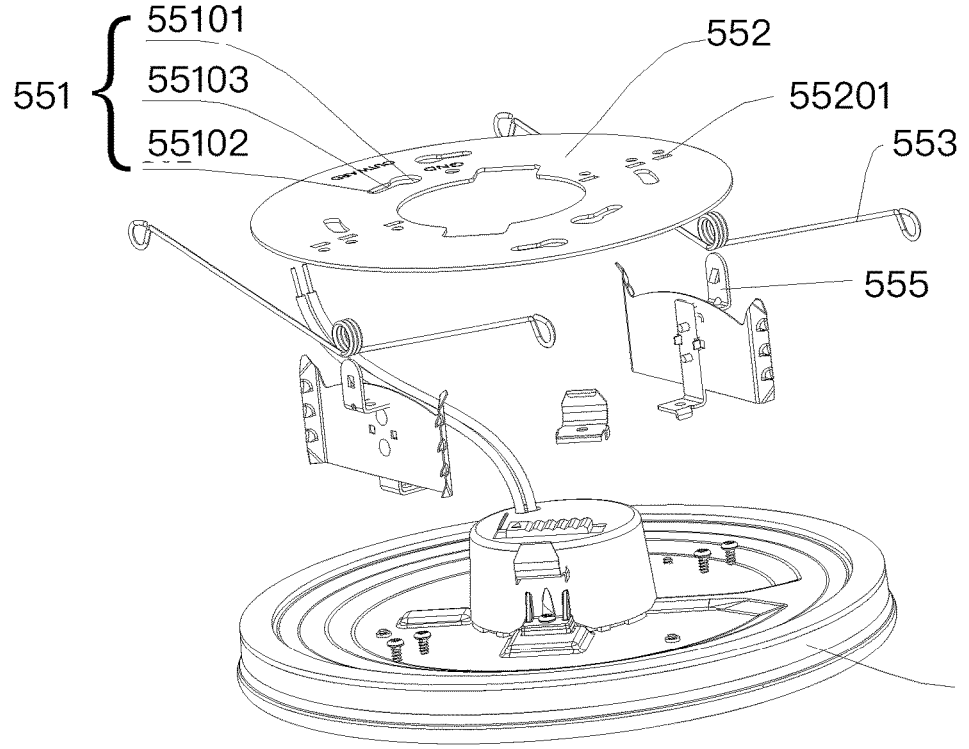
FIG. 60 illustrates an exploded view of the example in FIG. 59.

FIG. 60 illustrates an exploded view of the example in FIG. 59.

Figure 61:
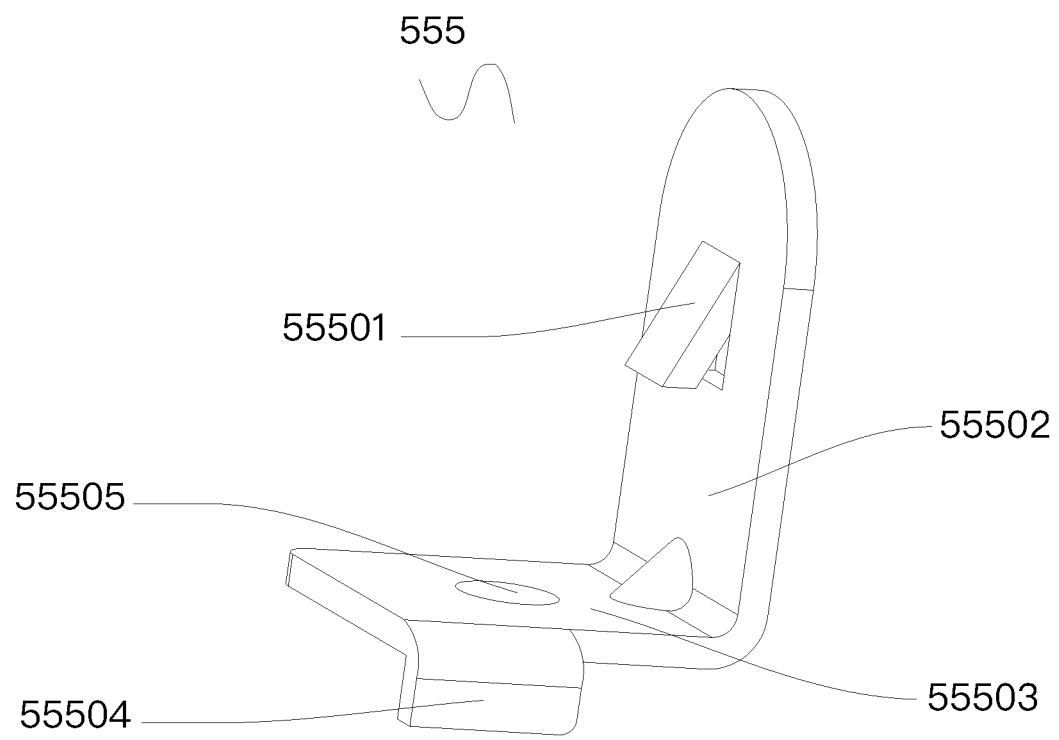
FIG. 61 illustrates a connector example.

FIG. 61 illustrates a connector example.

Figure 62:
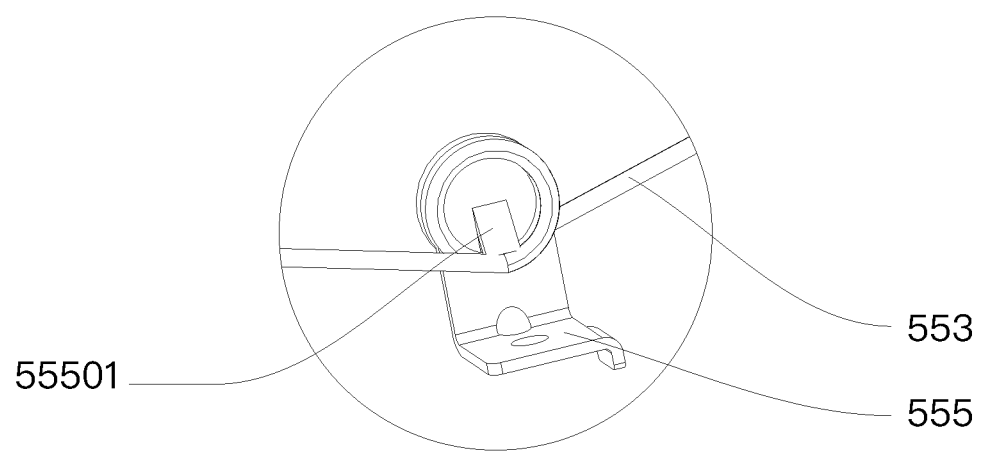
FIG. 62 illustrates a torsion spring zoom-up view.

FIG. 62 illustrates a torsion spring zoom-up view.

Figure 63:
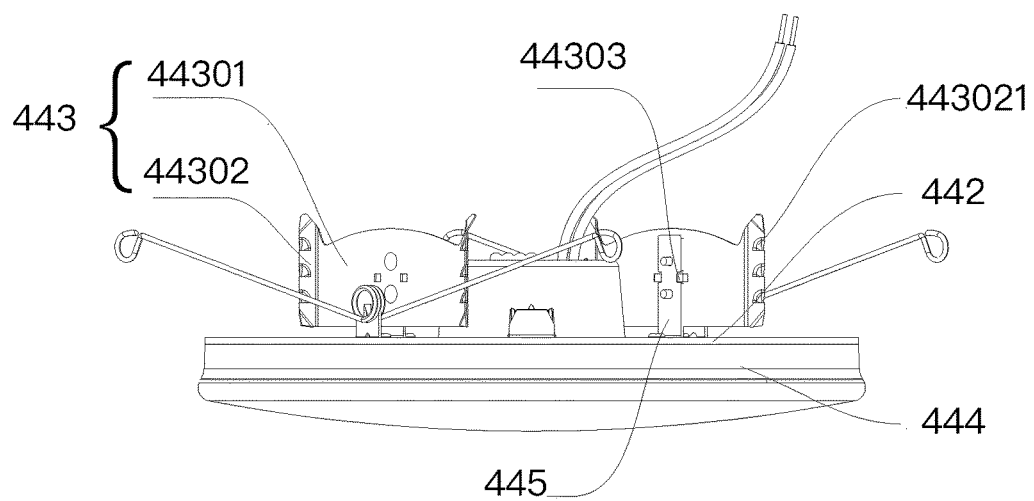
FIG. 63 illustrates another downlight example.

FIG. 63 illustrates another downlight example.

Figure 64:
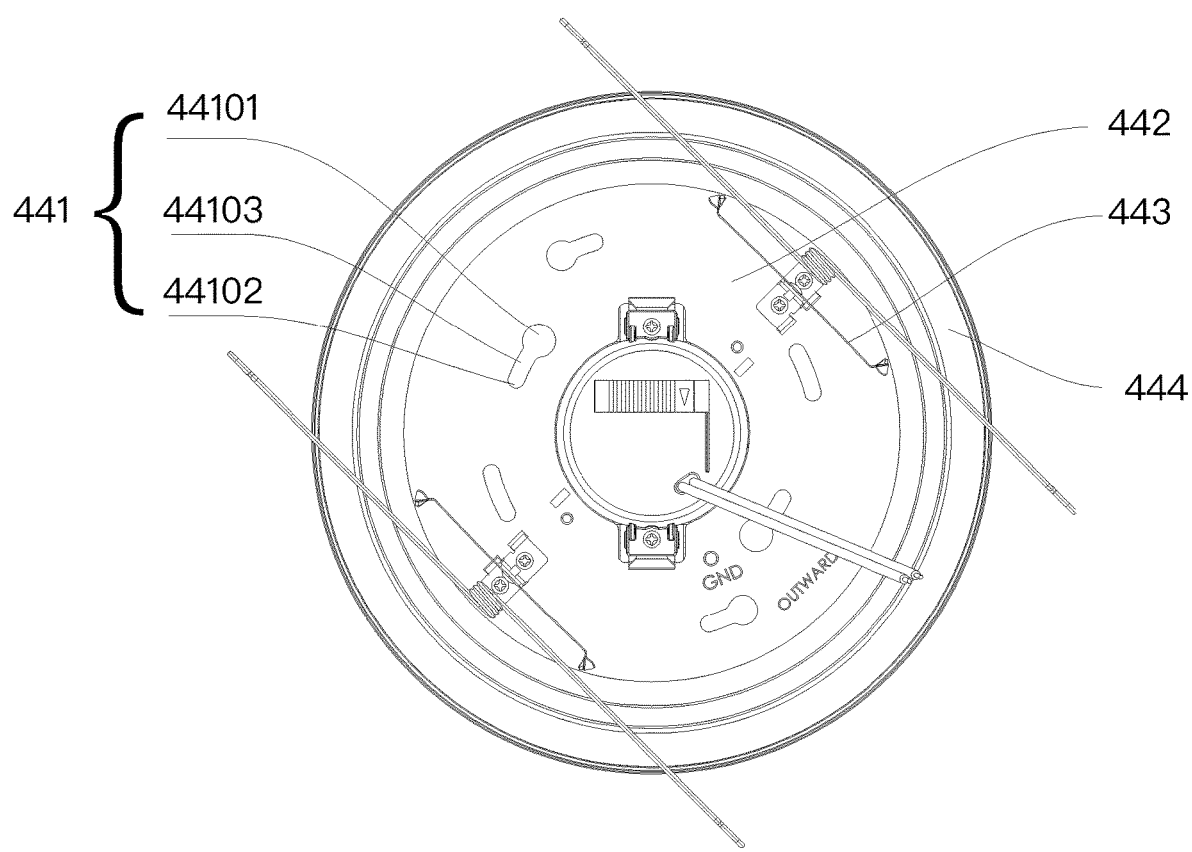
FIG. 64 illustrates a top view of the example in FIG. 63.

FIG. 64 illustrates a top view of the example in FIG. 63.

Figure 65:
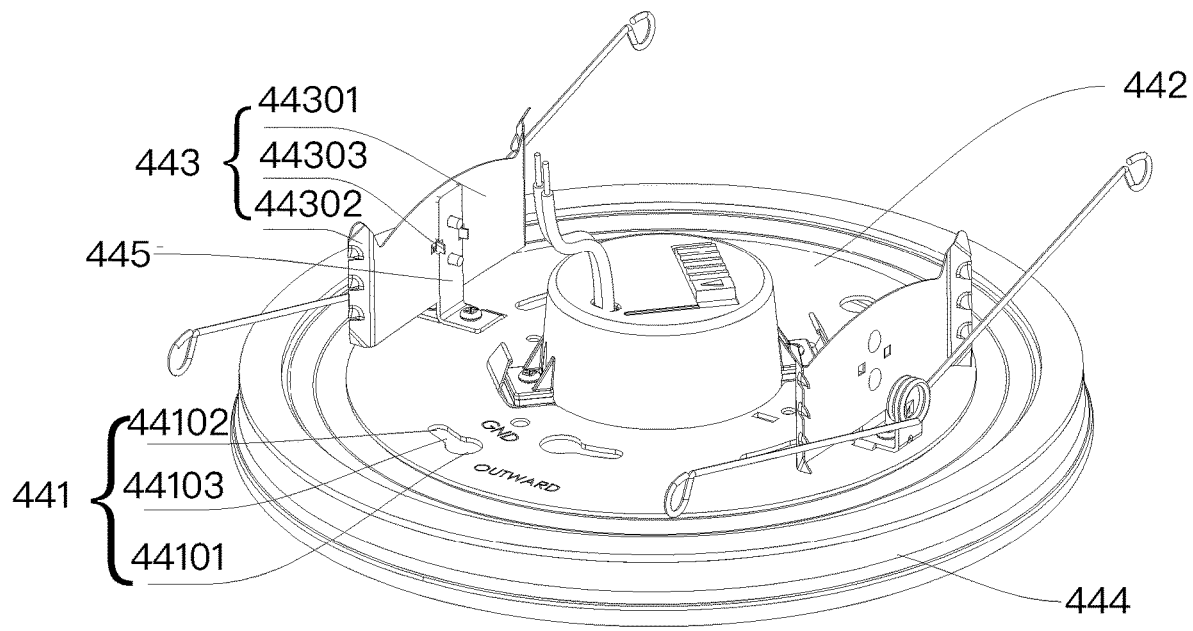
FIG. 65 illustrates another view of the example in FIG. 64.

FIG. 65 illustrates another view of the example in FIG. 64.

Figure 66:
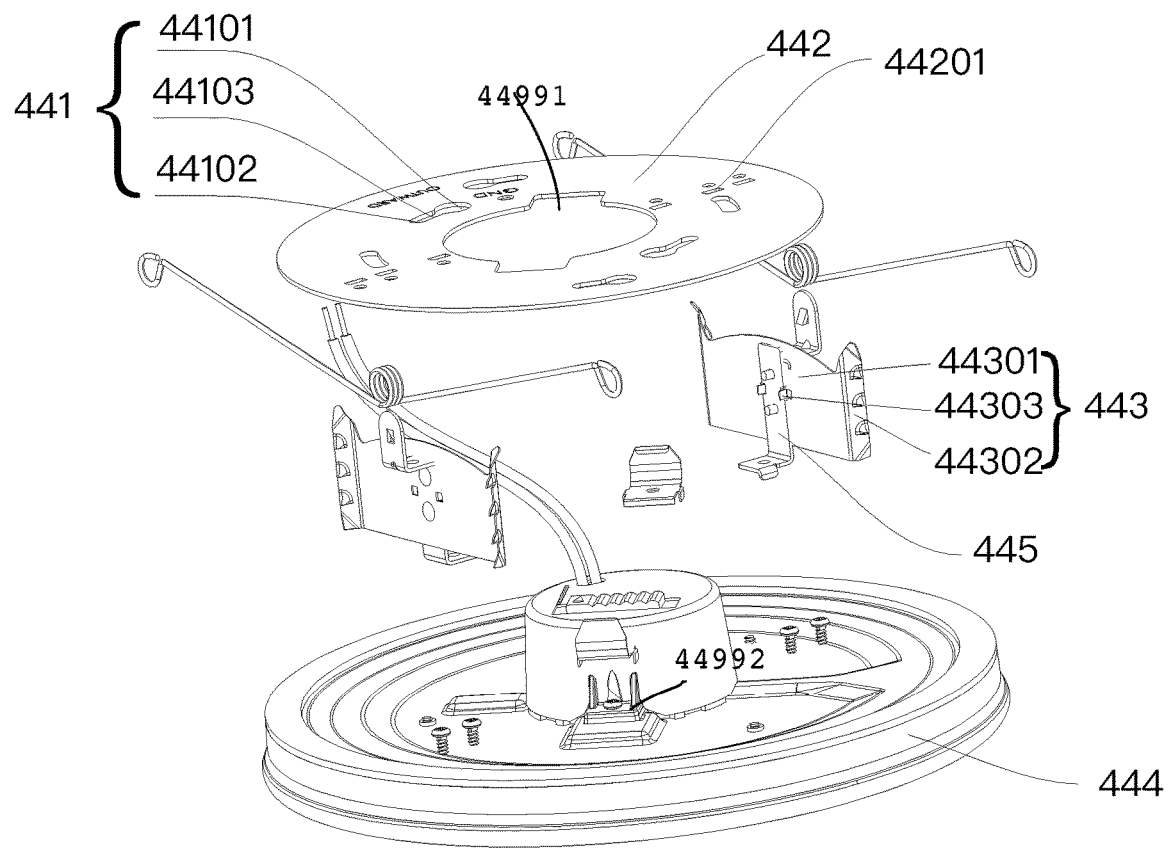
FIG. 66 illustrates an exploded view of the example in FIG. 65.

FIG. 66 illustrates an exploded view of the example in FIG. 65.

Figure 67:
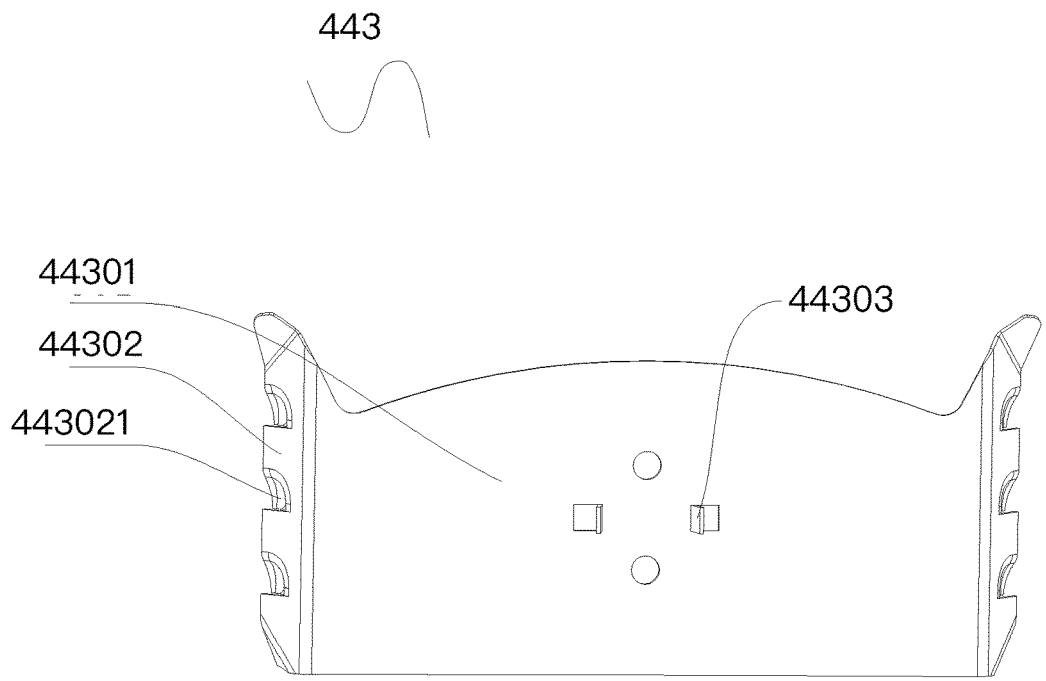
FIG. 67 illustrates an elastic plate example.

FIG. 67 illustrates an elastic plate example.

Figure 68:
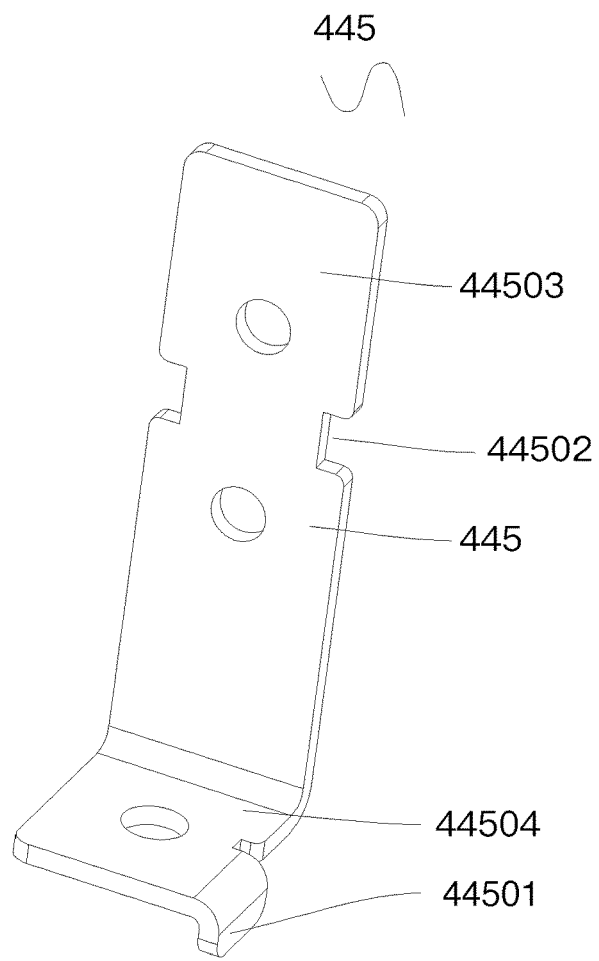
FIG. 68 illustrates a connector example.

FIG. 68 illustrates a connector example.

Figure 69:
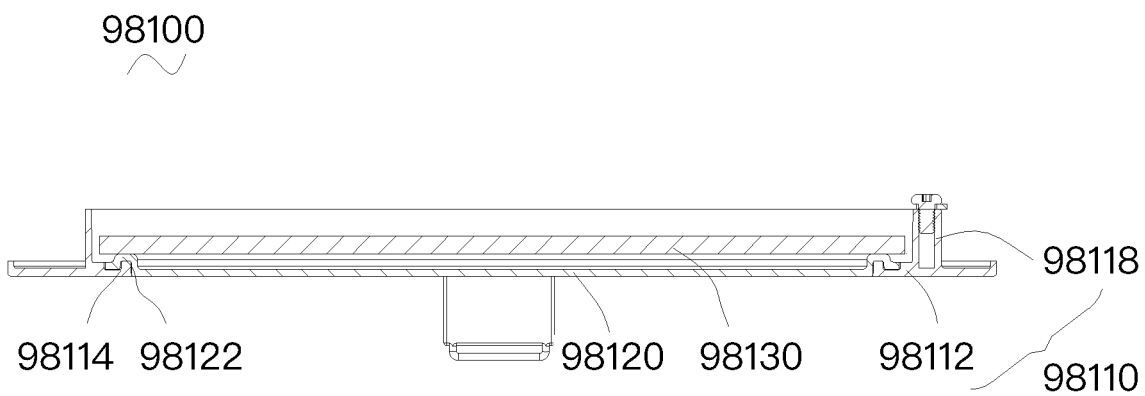
FIG. 69 illustrates a side view of a diffusion cover and related components.

FIG. 69 illustrates a side view of a diffusion cover and related components.

Figure 70:
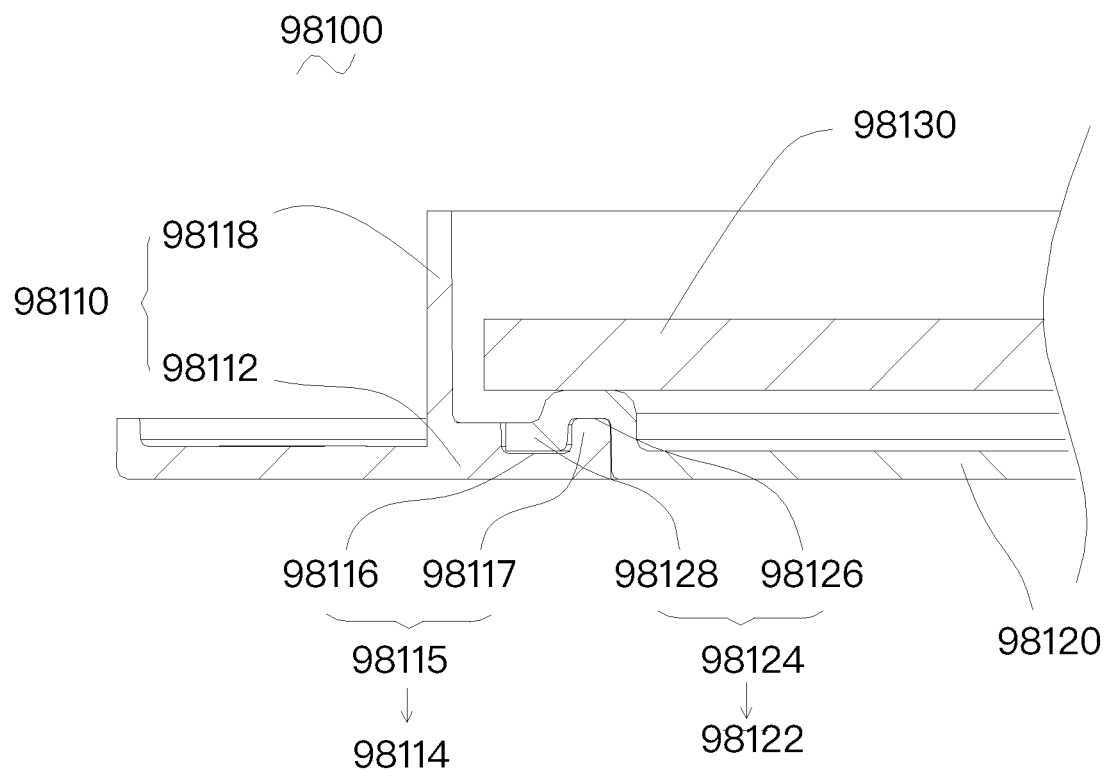
FIG. 70 illustrates a zoom-up view of the diffusion cover and related components.

FIG. 70 illustrates a zoom-up view of the diffusion cover and related components.

Figure 71:
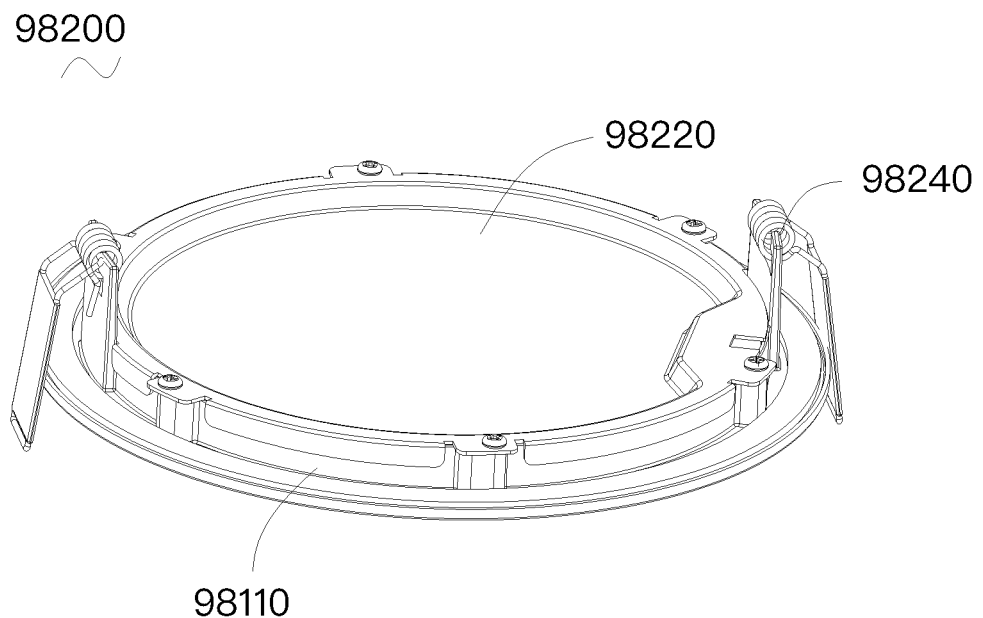
FIG. 71 illustrates a rim part example.

FIG. 71 illustrates a rim part example.

Figure 72:
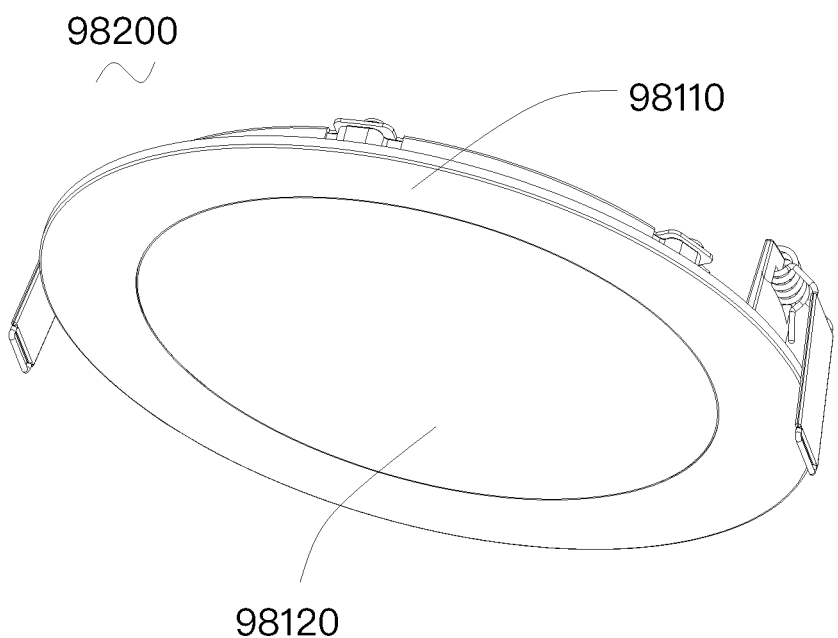
FIG. 72 illustrates another view of the example in FIG. 71.

FIG. 72 illustrates another view of the example in FIG. 71.

Figure 73:
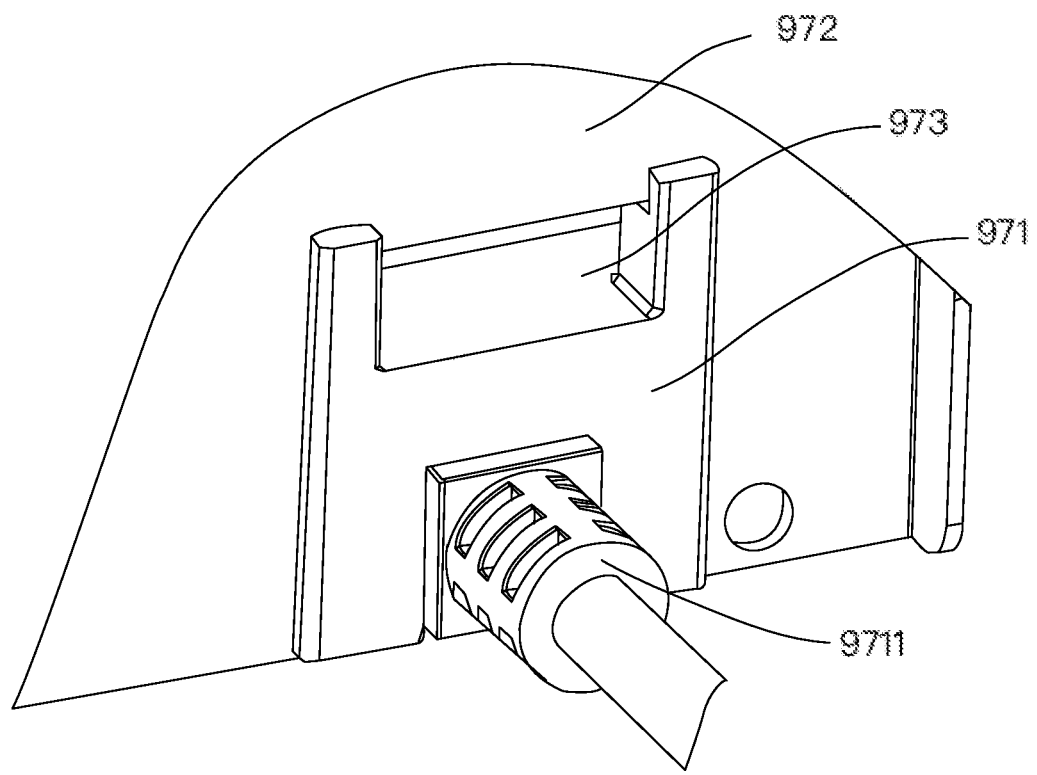
FIG. 73 illustrates a wiring unit example.

FIG. 73 illustrates a wiring unit example.

FIG. 74 illustrates an exploded view of the example in FIG. 73.

Figure 75:
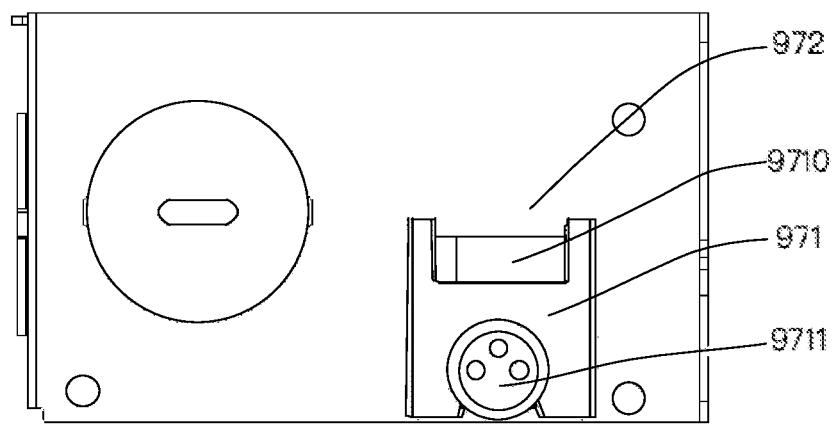
FIG. 75 illustrates a driver box with the wiring unit.

FIG. 75 illustrates a driver box with the wiring unit.

Figure 76:
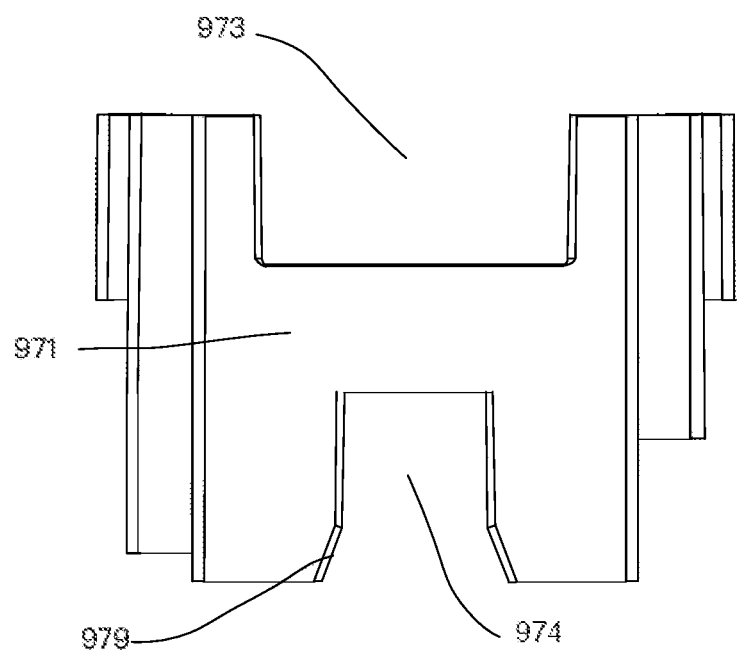
FIG. 76 illustrates a side view of the wiring unit.

FIG. 76 illustrates a side view of the wiring unit.

Figure 77:
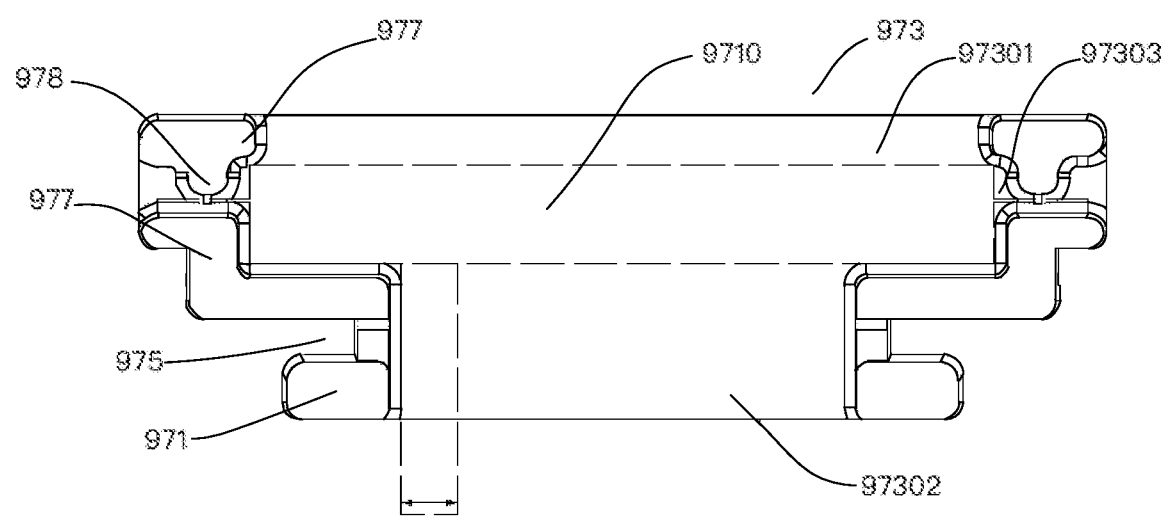
FIG. 77 illustrates another view of the wiring unit.

FIG. 77 illustrates another view of the wiring unit.

FIG. 78 illustrates another view of the wiring unit.

Figure 79:
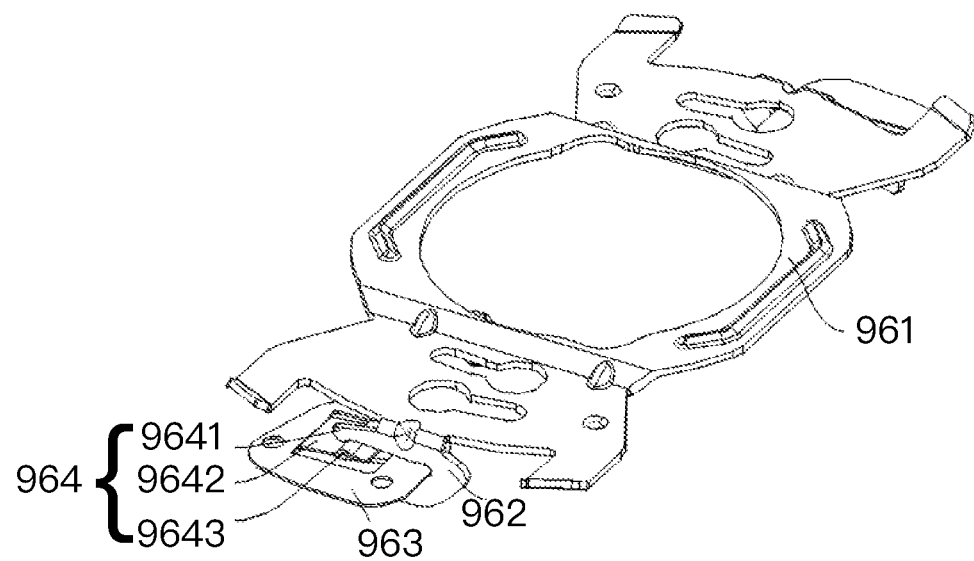
FIG. 79 illustrates a fixing bracket example.

FIG. 79 illustrates a fixing bracket example.

Figure 80:
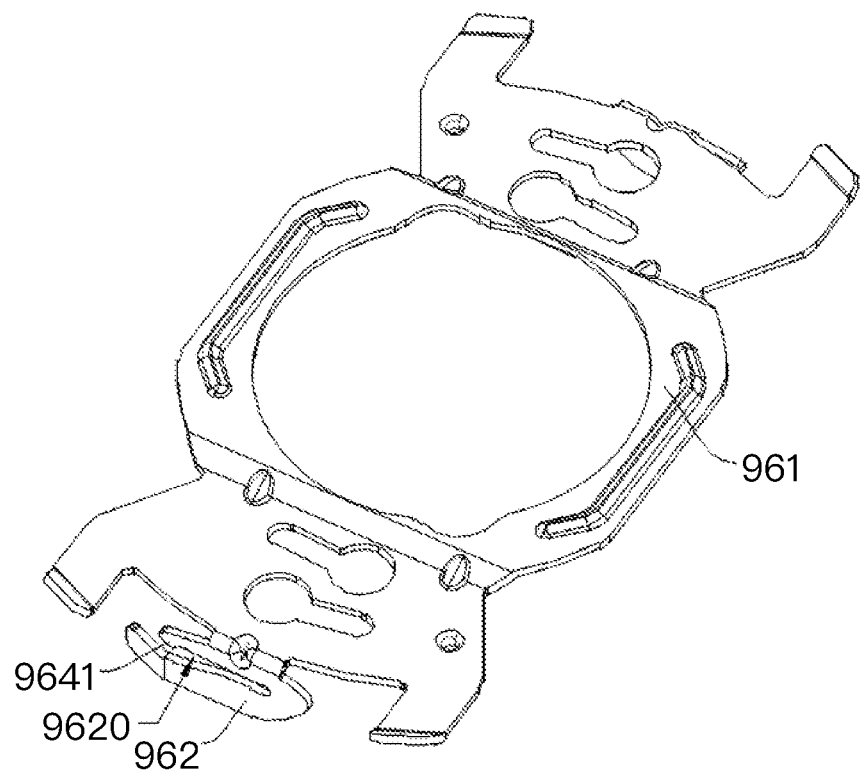
FIG. 80 illustrates another fixing bracket example.

FIG. 80 illustrates another fixing bracket example.

Figure 81:
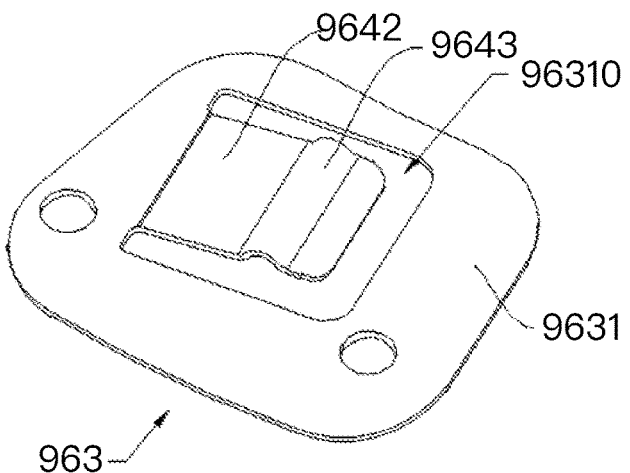
FIG. 81 illustrates an elastic stop unit example.

FIG. 81 illustrates an elastic stop unit example.

Figure 82:
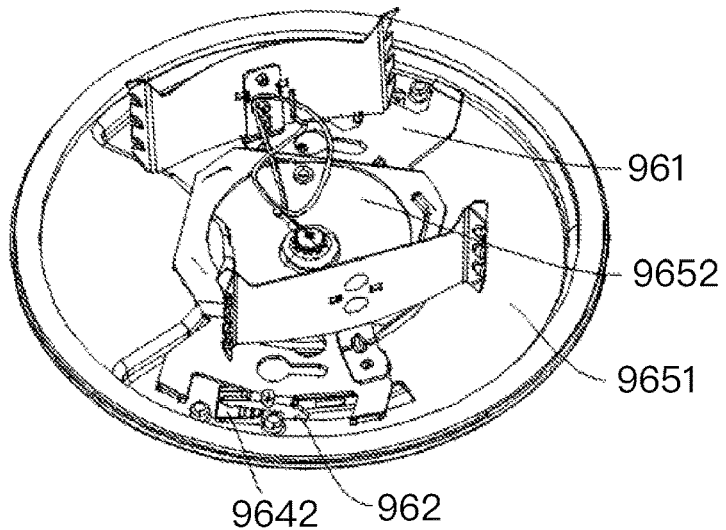
FIG. 82 illustrates a top view of a downlight example with the fixing bracket.

FIG. 82 illustrates a top view of a downlight example with the fixing bracket.

Figure 83:
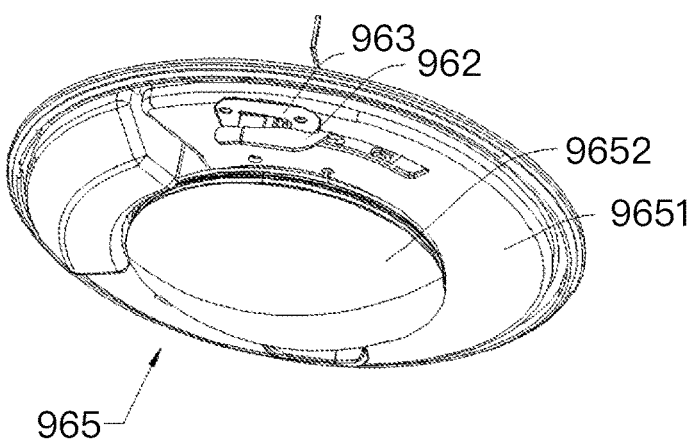
FIG. 83 illustrates another view of the example in FIG. 82.

FIG. 83 illustrates another view of the example in FIG. 82.

Figure 84:
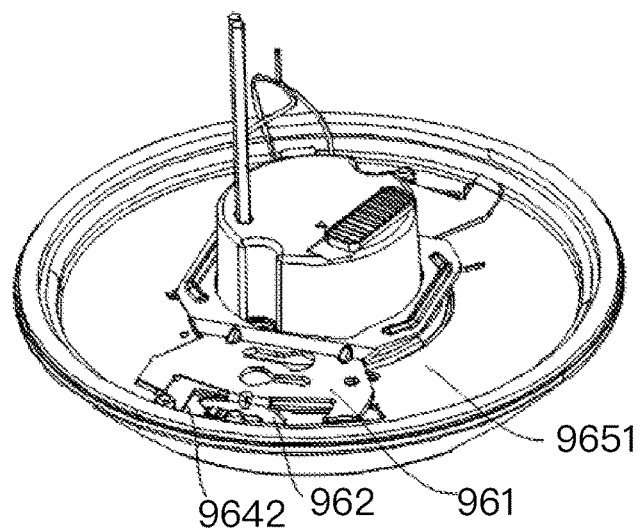
FIG. 84 illustrates a top view of another downlight example.

FIG. 84 illustrates a top view of another downlight example.

Figure 85:
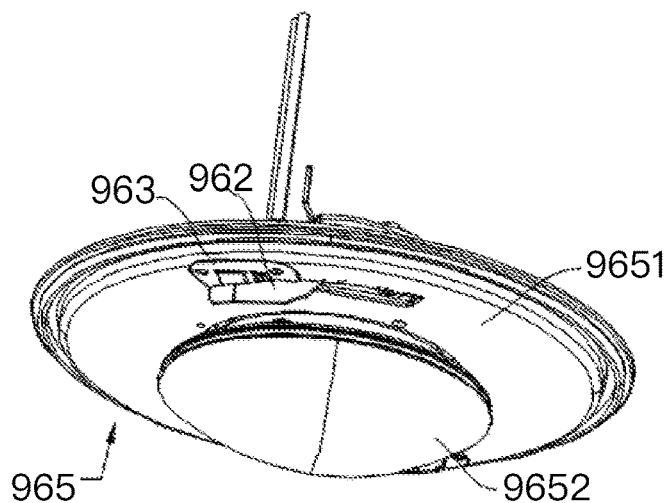
FIG. 85 illustrates another view of the example in FIG. 84.

FIG. 85 illustrates another view of the example in FIG. 84.

Figure 86:
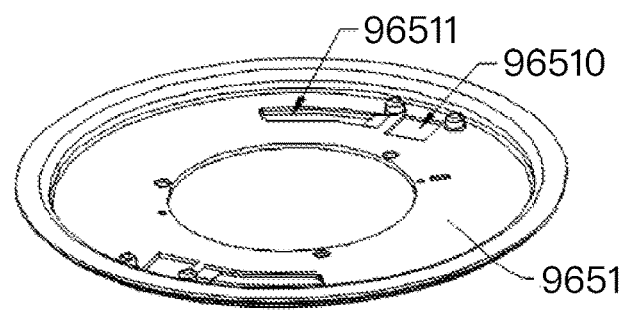
FIG. 86 illustrates a component in the example of FIG. 85.

FIG. 86 illustrates a component in the example of FIG. 85.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A downlight apparatus, comprising:
   a light source;
   a driver box for storing a driver, wherein the driver is connected to an external power source to generate a driving current to the light source;
   a light housing with a light holder and a rim, wherein the light source is stored in the light holder, wherein the rim defines a light opening for a light of the light source to escape; and
   an electrode socket, wherein the light source comprises a light source plate mounted with LED modules, wherein the light source plate has a plate hole for inserting and fixing the electrode socket, wherein the electrode socket has an insulation base with a first electrode groove and a second electrode groove, wherein the insulation base defines a first electrode hole and second electrode hole, the electrode socket has a first metal unit and a second metal unit, the first metal unit and the second metal unit respectively have elastic receivers for inserting a driver electrode electrically connecting to the driver.

2. The downlight apparatus of claim 1, wherein the first metal unit and the second metal unit respectively have an elongated bar respectively extending along the first electrode groove and the second electrode groove, wherein the first metal unit and the second metal unit respectively have a contact end for electrically connecting to the LED modules on the light source plate.

3. The downlight apparatus of claim 2, wherein the first electrode groove and the second electrode groove are above a top surface of the light source plate.

4. The downlight apparatus of claim 3, wherein the contact ends extend along an edge of the insulation to be welded to light source electrodes of the light source plate.

5. The downlight apparatus of claim 1, wherein electrode receiver has an elastic clip for inserting the driver electrode.

6. The downlight apparatus of claim 5, wherein the elastic clip is a reverse hook with a smaller force on attaching the driver electrode to the electrode receiver than detaching the driver electrode off the electrode receiver.

7. The downlight apparatus of claim 1, wherein any metal part of the electrode socket and the driver electrode is kept longer than 4 mm from any metal part of the light source plate.

8. The downlight apparatus of claim 1, wherein any metal part of the electrode socket and the driver electrode is kept longer than 1 mm from any metal part of the light source plate.

9. The downlight apparatus of claim 1, wherein the insulation base has a light reflective layer for redirecting the light of the light source.

10. The downlight apparatus of claim 1, wherein the electrode socket has an antenna socket for plugging an antenna.

11. The downlight apparatus of claim 1, wherein the insulation base has a middle protrusion separating the first electrode groove and the second electrode groove.

12. The downlight apparatus of claim 1, wherein the driver box has a wall with an installation escape.

13. The downlight apparatus of claim 12, further comprising a stop unit fixed to the installation escape, wherein the stop unit has a switch holder and a wire holder, wherein a manual switch is placed in the switch holder and an enlarged wire head of an power wire is placed in the wire holder, wherein an operation part of the manual switch is exposed outside the driver box, wherein the manual switch is connected to the driver for adjusting a setting of the driver.

14. The downlight apparatus of claim 13, wherein the stop unit has two lateral grooves as tracks for sliding the two lateral edges of the first U-shape concave to attach the stop unit to the driver box.

15. The downlight apparatus of claim 14, wherein a front plate and a back plate of the stop unit form the two lateral grooves, wherein the front plate is closer to outside of the driver box than the back plate, wherein the back plate has a larger diameter than the front plate to prevent water to move in the drive box.

16. The downlight apparatus of claim 13, wherein the switch holder is a second concave U-shape concave of the stop unit, wherein the manual switch is inserted and fixed to the second U-shape concave.

17. The downlight apparatus of claim 16, wherein the switch holder has two switch grooves for inserting and fixing two lateral edges of the manual switch.

18. The downlight apparatus of claim 17, wherein the switch holder has a front space and a back space, wherein the back space is used for storing a switch board, wherein the front space is used for storing an operation unit of the manual switch.

19. The downlight apparatus of claim 16, wherein the wire holder is a third U-shape concave of the stop unit, wherein the enlarged wire head is inserted and fixed to the third U-shape concave.

* * * * *